United States Patent
Johnson

(10) Patent No.: US 8,503,642 B2
(45) Date of Patent: Aug. 6, 2013

(54) SYSTEM AND METHOD FOR MANAGING A TELECOMMUNICATIONS NETWORK

(75) Inventor: Diana Johnson, Las Vegas, NV (US)

(73) Assignee: NOS Communications, Inc., Las Vegas, NV (US)

( * ) Notice: Subject to any disclaimer, the term of this patent is extended or adjusted under 35 U.S.C. 154(b) by 1430 days.

(21) Appl. No.: 12/073,242

(22) Filed: Mar. 3, 2008

(65) Prior Publication Data
US 2008/0226044 A1 Sep. 18, 2008

Related U.S. Application Data

(60) Provisional application No. 60/904,165, filed on Mar. 1, 2007.

(51) Int. Cl.
H04M 3/42 (2006.01)
H04M 11/00 (2006.01)
H04M 15/00 (2006.01)

(52) U.S. Cl.
USPC .............. 379/201.01; 379/93.12; 379/112.06; 379/133; 379/201.12

(58) Field of Classification Search
USPC ................... 379/201.02, 201.12, 9.04, 93.12, 379/112.06, 121.04, 126, 133, 136, 139, 379/201.01, 201.03, 201.04, 207.04
See application file for complete search history.

(56) References Cited

U.S. PATENT DOCUMENTS

| | | | |
|---|---|---|---|
| 6,070,147 A | | 5/2000 | Harms et al. |
| 6,075,848 A | * | 6/2000 | Lunn et al. ............... 379/112.01 |
| 6,859,783 B2 | | 2/2005 | Cogger et al. |
| 6,985,576 B1 | | 1/2006 | Huck |
| 2003/0229613 A1 | * | 12/2003 | Zargham et al. .................. 707/1 |
| 2006/0146783 A1 | * | 7/2006 | Yurchenko .................... 370/351 |

* cited by examiner

*Primary Examiner* — Khai N Nguyen
(74) *Attorney, Agent, or Firm* — Kelley Drye & Warren LLP

(57) ABSTRACT

A system and method for managing a telecommunications network and which may let a user monitor and control the user's network telephone services is disclosed. The system may include a CEO Dashboard, a Migration Module, and a Trouble Ticket Wizard. Additionally, the system may include backend processes that periodically run, ensuring that everything is being done to retrieve, and store, the user's available resources on the network. The system may be provided by an integrated platform that is available through online web access and that includes functions such as provisioning, billing, line management, and account management.

18 Claims, 45 Drawing Sheets

FIG. 13B

30 DAY SUMMARY REPORTS — 1316

INTERLATA

| ACCOUNT NAME | 30 DAYS AGO | ANI'S ADDED | ANI'S LOST | CURRENT ACTIVE ANI'S |
|---|---|---|---|---|
| HOUSE BETA ACCOUNT | 66 | 4 | 0 | 70 |
| LOCAL | 81 | 0 | 0 | 81 |

INTRALATA

| ACCOUNT NAME | 30 DAYS AGO | ANI'S ADDED | ANI'S LOST | CURRENT ACTIVE ANI'S |
|---|---|---|---|---|
| HOUSE BETA ACCOUNT | 64 | 3 | 0 | 67 |
| LOCAL | 81 | 0 | 0 | 81 |

TOLLFREE

| ACCOUNT NAME | 30 DAYS AGO | TOLL-FREES ADDED | TOLL-FREES LOST | CURRENT ACTIVE TOLLFREES |
|---|---|---|---|---|
| HOUSE BETA ACCOUNT | 48 | 2 | 0 | 50 |

REMAINING PREPAID BALANCE      UPDATED 10/12/2006 1:34AM — 1310

| CALL DATE | CALLS | DURATION | AMOUNT |
|---|---|---|---|
| 10/11/2006 | 178 | 270.0 | $15.18 |
| 10/10/2006 | 137 | 325.0 | $16.70 |
| 10/09/2006 | 139 | 368.0 | $17.29 |
| 10/08/2006 | 7 | 28.0 | $0.87 |
| 10/07/2006 | 11 | 57.0 | $3.61 |
| 10/06/2006 | 169 | 324.0 | $15.99 |
| 10/05/2006 | 133 | 224.0 | $15.58 |

TOP 5 INT'L DESTINATIONS BY CALL COUNT (LAST 30 DAYS) — 1308

| COUNTRY | NAME | CALL COUNT | DURATION |
|---|---|---|---|
| 44 | UNITED KINGDOM | 40 | 158.0 |
| 52 | MEXICO | 37 | 251.0 |
| 63 | PHILIPPINES | 32 | 423.0 |
| 972 | ISRAEL | 27 | 16.0 |
| 7 | RUSSIA | 27 | 51.0 |

TOP 5 INT'L DESTINATIONS BY DURATION (LAST 30 DAYS) — 1306

| COUNTRY | NAME | CALL COUNT | DURATION |
|---|---|---|---|
| 63 | PHILIPPINES | 32 | 423 |
| 52 | MEXICO | 37 | 251 |
| 44 | UNITED KINGDOM | 40 | 158 |
| 20 | EGYPT | 22 | 143 |
| 66 | THAILAND | 2 | 121 |

1300

ANI Networks VERSION: 2.3.1.3

WELCOME: LISAS
LOG OUT
CHANGE PASSWORD

| HOME | ADMIN | MIGRATION | PROFILE | REPORTS | LOADING | MAINTENANCE | FINANCE | RESOURCES | BILLING |
|---|---|---|---|---|---|---|---|---|---|

CUSTOMER ID: 100003    BILLING NAME: ANI NETWORKS INC HOUSE

ADMIN > USERS

PORTAL RIGHTS

USERS

| USERNAME | EMAIL | LAST ACTIVITY | ACTIVE | ONLINE | EDIT USER |
|---|---|---|---|---|---|
| DIANA | IAMDEKE@HOTMAIL.COM | 5/3/2007 1:01:45 PM | ☑ | ☐ | EDIT |
| JAMLEC | JOUMMINS@ANINETWORKS.COM | 5/24/2007 12:03:12 PM | ☑ | ☐ | EDIT |
| LISAS | ISALYEN@ANINETWORKS.COM | 6/1/2007 3:59:46 PM | ☑ | ☐ | EDIT |

ADD USER    RETURN TO PREVIOUS SCREEN

| STATE | 0444 | 0555 | 0432 | 0210/0555 | 0210/5406 | MNY | MCA | SNY | NCA | STX |
|---|---|---|---|---|---|---|---|---|---|---|
| + ALABAMA | □ | □ | □ | □ | □ | □ | □ | □ | □ | □ |
| − ALASKA | □ | □ | □ | □ | □ | □ | □ | □ | □ | □ |
| + ARIZONA | □ | □ | □ | □ | □ | □ | □ | □ | □ | □ |
| + ARKANSAS | □ | □ | □ | □ | □ | □ | □ | □ | □ | □ |
| ▽ CALIFORNIA | □ | ▷ | ▷ | ▷ | ▷ | ▷ | ▷ | ▷ | ▷ | □ |
| 209 | ▷ | □ | □ | □ | □ | □ | □ | □ | □ | □ |
| 213 | □ | □ | □ | □ | □ | □ | □ | □ | □ | □ |
| 310 | □ | □ | □ | □ | □ | □ | □ | □ | □ | □ |
| 323 | □ | □ | □ | □ | □ | □ | □ | □ | □ | □ |
| 626 | □ | □ | □ | □ | □ | □ | □ | □ | □ | □ |

*FIG. 16C*

| CARRIER DESCRIPTION | ACCOUNT |
|---|---|
| 0444 | 0898170802 ▷ |
| 0555 NO-CABS | 116333 ▷ |
| 0555 CABS | 115271 ▷ |
| 0432 | 120836669 ▷ |
| 0210/0555 | 115345 ▷ |
| 0210/5406 | N/A ▷ |

*FIG. 16D*

PROVISIONING OFFERED STATES

| STATE: | PROVISIONING ALLOWED |
|---|---|
| AL ALABAMA | ☐ |
| AK ALASKA | ☐ |
| AZ ARIZONA | ☐ |
| AR ARKANSAS | ☐ |
| CA CALIFORNIA | ☐ |
| CO COLORADO | ☐ |
| CT CONNECTICUT | ☐ |
| DE DELAWARE | ☐ |
| FL FLORIDA | ☐ |
| GA GEORGIA | ☐ |
| HI HAWAII | ☐ |
| ID IDAHO | ☐ |
| IL ILLINOIS | ☐ |
| IN INDIANA | ☐ |
| IA IOWA | ☐ |
| KS KANSAS | ☐ |
| KY KENTUCKY | ☐ |
| LA LOUISIANA | ☐ |
| ME MAINE | ☐ |
| MD MARYLAND | ☐ |
| MA MASSACHUSETTS | ☐ |
| MI MICHIGAN | ☐ |
| MN MINNESOTA | ☐ |
| MS MISSISSIPPI | ☐ |
| MO MISSOURI | ☐ |
| MT MONTANA | ☐ |
| NE NEBRASKA | ☐ |
| NV NEVADA | ☐ |
| NH NEW HAMPSHIRE | ☐ |
| NJ NEW JERSEY | ☐ |
| NM NEW MEXICO | ☐ |
| NY NEW YORK | ☐ |
| NC NORTH CAROLINA | ☐ |
| ND NORTH DAKOTA | ☐ |
| OH OHIO | ☐ |
| OK OKLAHOMA | ☐ |
| OR OREGON | ☐ |
| PA PENNSYLVANIA | ☐ |
| RI RHODE ISLAND | ☐ |
| SC SOUTH CAROLINA | ☐ |
| SD SOUTH DAKOTA | ☐ |
| TN TENNESSEE | ☐ |
| TX TEXAS | ☐ |
| UT UTAH | ☐ |
| VT VERMONT | ☐ |
| VA VIRGINIA | ☐ |
| WA WASHINGTON | ☐ |
| WV WEST VIRGINIA | ☐ |
| WI WISCONSIN | ☐ |

[SEND] [CANCEL]

ANI Networks VERSION: 2.0.0.4

WELCOME: LISAS
LOG OUT
CHANGE PASSWORD

HOME ADMIN MIGRATION PROFILE REPORTS LOADING MAINTENANCE FINANCE RESOURCES BILLING

CUSTOMER ID: 100003    BILLING NAME: ANIN HOUSE

REPORTS > REPORT REQUESTER

REPORT BUILDER
REPORT REQUESTER
REPORT VIEWER

REPORT REQUESTER

SELECT A REPORT FROM THE LIST BELOW:

- LOST ANI REPORT
- OUTBOUND MIGRATION REPORT
- TOLLFREE MIGRATION REPORT
- UNRESOLVED REJECTS DETAIL REPORT

REPORT DESCRIPTION

LOST ANI REPORT

REPORT ARGUMENTS

CUSTOMER ID: 100003
START DATE:
END DATE:

SUBMIT   CANCEL

ANI Networks VERSION: 2.0.0.4

WELCOME: LISAS
LOG OUT
CHANGE PASSWORD

HOME ADMIN MIGRATION PROFILE REPORTS LOADING MAINTENANCE FINANCE RESOURCES BILLING

CUSTOMER ID: 100003    BILLING NAME: ANIN HOUSE

REPORTS > REPORT VIEWER

- REPORT BUILDER
- REPORT REQUESTER
- REPORT VIEWER

REPORT VIEWER

REPORT START DATE: 12/11/2006
REPORT END DATE: 12/11/2006

☐ SHOW ALL COMPANY REPORTS

[SEARCH]

| REPORT DATE | FILENAME |
|---|---|
| 12/11/2006 10:06:59 AM | TOLLFREEENHANCEMENT(20061211100658).CSV |
| 12/11/2006 6:49:57 AM | ANISEARCHREPORT(20061211084955).CSV |

ANI Networks VERSION TESTING 2.3.1.5

WELCOME: LISAS  
[LOG OUT]  
CHANGE PASSWORD

| HOME | ADMIN | MIGRATION | PROFILE | REPORTS | LOADING | MAINTENANCE | FINANCE | RESOURCES | BILLING |

ANI MAINTENANCE | CUSTOMER ID: 100003 | BILLING NAME: ANI NETWORKS INC HOUSE

MAINTENANCE > TROUBLE TICKET MANAGEMENT

TOLLFREE MAINTENANCE

TROUBLE TICKET MANAGEMENT

TROUBLE TICKET MANAGEMENT

START DATE: 06/08/2007  
END DATE: 06/08/2007  
STATUS: ALL  
WTN/TF/CC:  
CATEGORY: ALL

| TICKET ID | OPENED DATE | STATUS | PHONE NUMBER | TROUBLE TYPE | LAST STATUS DATE | CATEGORY |
|---|---|---|---|---|---|---|
| 1355 | 6/8/2007 10:31:31AM | NEW | 8664498277 | ECHO | 6/8/2007 10:31:31AM | TOLLFREE |
| 1356 | 6/8/2007 10:46:56AM | REPAIR IN PROGRESS | 7025478532 | TEST | 6/8/2007 11:01:11AM | ANI |

*FIG. 19C*

ANI Networks VERSION TESTING 2.2.0.2

WELCOME: LISAS
LOG OUT
CHANGE PASSWORD

HOME   ADMIN   MIGRATION   PROFILE   REPORTS   LOADING   MAINTENANCE   FINANCE   RESOURCES   BILLING

CUSTOMER ID: 100003    BILLING NAME: ANIN HOUSE

VIEW TRANSACTIONS
VIEW/ALL CHARGES
CDR RATE DISPUTES
CARRIER DISPUTE REQUEST

FINANCE > VIEW TRANSACTIONS

VIEW TRANSACTIONS

START DATE: 8/30/2006
END DATE: 1/30/2007

● PREPAID  ○ POSTPAID

[SUBMIT]  [CANCEL]

| TRANSACTION ID | CUSTOMER ID | ACCOUNT ID | DATE ENTERED | WHO ENTERED | AMOUNT | TRANSACTION TYPE | DESCRIPTION | INVOICE ID |
|---|---|---|---|---|---|---|---|---|
| 164B | 10003 | 1001 | 9/5/2006 1:00:12PM | 100001\ DJOHNSON | -$0.02 | P43 | USBI CREDIT | |

*FIG. 20A*

ANI Networks VERSION TESTING 2.2.0.2

WELCOME: LISAS
LOG OUT
CHANGE PASSWORD

HOME  ADMIN  MIGRATION  PROFILE  REPORTS  LOADING  MAINTENANCE  FINANCE  RESOURCES  BILLING

CUSTOMER ID: 100003    BILLING NAME: ANIN HOUSE

VIEW TRANSACTIONS
VIEW ALL CHARGES
CDR RATE DISPUTES
CARRIER DISPUTE REQUEST

FINANCE > VIEW CHARGES

VIEW TRANSACTIONS

START DATE: 1/1/2007
END DATE: 1/30/2007

1001-HOUSE ▾

● PREPAID  ○ POSTPAID

[SUBMIT]  [CANCEL]

| CUSTOMER ID | ACCOUNT ID | DATE ENTERED | WHO ENTERED | AMOUNT | DESCRIPTION |
|---|---|---|---|---|---|
| 100003 | 1001 | 1/2/2007 6:34:15 PM | NOT POSTED | $6.24 | LONG DISTANCE CHARGES |
| 100003 | 1001 | 1/2/2007 5:34:25 PM | NOT POSTED | $0.02 | LONG DISTANCE CHARGES |
| 100003 | 1001 | 1/2/2007 4:33:37 PM | NOT POSTED | $3.61 | LONG DISTANCE CHARGES |
| 10003 | 1001 | 1/2/2007 3:38:29 PM | NOT POSTED | $2.73 | LONG DISTANCE CHARGES |

ANI Networks  VERSION TESTING 2.2.0.2

WELCOME: LISAS
LOG OUT
CHANGE PASSWORD

HOME | ADMIN | MIGRATION | PROFILE | REPORTS | LOADING | MAINTENANCE | FINANCE | RESOURCES | BILLING

CUSTOMER ID: 100003    BILLING NAME: ANIN HOUSE

FINANCE > CARRIER RATE DISPUTES

- VIEW TRANSACTIONS
- VIEW ALL CHARGES
- CDR RATE DISPUTES
- CARRIER DISPUTE REQUEST

CARRIER DISPUTE REQUEST

- CUSTOMER ID: 100003
- ACCOUNT ID: 1001
- DISPUTE DATE: 1/30/2007
- BILL CYCLE:
- CUSTOMER ASSOCIATION:
- DISPUTE CONTACT NAME:
- DISPUTE CONTACT PHONE NUMBER:
- DISPUTE CONTACT EMAIL:
- CUSTOMER SUPPORT MANAGER:
- DISPUTE START DATE:
- DISPUTE END DATE:
- DISPUTE AMOUNT:
- INVOICE NUMBER:
- CUSTOMER TAX EXEMPT: ☐
- PRODUCT ID: MRC
- PRODUCT DESCRIPTION:
- DISPUTE TYPE ID: BILLING COMMENCEMENT
- DISPUTE DESCRIPTION:
- RATE TYPE ID: ALL RATES ON INVOICE
- RATE DESCRIPTION:

2000

ANI Networks VERSION TESTING 2.2.0.2

WELCOME: LISAS  
LOG OUT  
CHANGE PASSWORD

HOME | ADMIN | MIGRATION | PROFILE | REPORTS | LOADING | MAINTENANCE | FINANCE | RESOURCES | BILLING

CUSTOMER ID: 100003   BILLING NAME: ANIN HOUSE

FORMS LIBRARY

RESOURCES > FORMS LIBRARY

FORMS LIBRARY

CATEGORY: [ ALL CATEGORIES ▼ ]

| ID | TITLE | DESCRIPTION | CATEGORY |
|----|-------|-------------|----------|
| 53 | ANI NETWORKS ESCALATION LIST | CUSTOMER SUPPORT CONTACT ESCALATION LIST. | CUSTOMER |
| 3 | ANI NETWORKS NETWORK LOA | LOA TO DEPLOY YOUR CIC ON OUR NETWORK | CUSTOMER |
| 35 | ANIN CALL TYPES & CALL TRANSPORTS KEY | ANIN CALL TYPES & CELL TRANSPORTS KEY | CUSTOMER |
| 16 | ANIN CDR LAYOUT | THIS IS THE RECORD LAYOUT FOR THE CDR FILES THAT YOU RECEIVE FROM ANI NETWORKS. | CUSTOMER |
| 51 | ANIN GX CDR LAYOUT | ANI NETWORKS VERSION OF THE GLOBAL CROSSING CDR FORMAT | CUSTOMER |
| 50 | ANIN TCSI CODES | ANIN TCSI CODES UPDATED 9-7-06 | CUSTOMER |

ANI Networks VERSION TESTING 2.2.0.2

WELCOME: LISAS
LOG OUT
CHANGE PASSWORD

| HOME | ADMIN | MIGRATION | PROFILE | REPORTS | LOADING | MAINTENANCE | FINANCE | RESOURCES | BILLING |

CUSTOMER RATE MAINTENANCE | CUSTOMER ID: 100003 | BILLING NAME: ANIN HOUSE

INVOICE DELIVERY | BILLING > INVOICE DELIVERY

INVOICE CDR DELIVERY

INVOICE CDR DELIVERY

ENTER FILE NAME (LEAVE BLANK FOR ALL) [          ]

FILES

START DATE: 1/30/2007 [📅▼]
END DATE: 1/30/2007 [📅▼]
ACCOUNT NUMBER: [ALL ▼]

[DATE/ACCT]  [CANCEL]

| DATE POSTED | ACCOUNT ID | FILENAME | FILE SIZE (KB) | FILE TYPE |
|---|---|---|---|---|
| 1/12/2007 4:25:49 PM | 1001 | NDZ1001 INV0336 20070112 134540.ZIP | 12,649.3 | CDRZIP |
| 12/13/2006 1:08:12 PM | 1001 | NDZ1001 INV0282 20061213 103357.ZIP | 12,960.8 | CDRZIP |
| 11/8/2006 3:55:56 PM | 1001 | NDZ1001 INV0236 20061108 143406.ZIP | 12,654.8 | CDRZIP |
| 10/7/2006 1:32:08 PM | 1001 | NDZ1001 INV0191 20061007 123629.ZIP | 7,985.6 | CDRZIP |
| 9/8/2006 6:11:48 PM | 1001 | NDZ1001 INV0144 20060908 170002.ZIP | 1,781.9 | CDRZIP |
| 8/4/2006 6:32:59 PM | 1001 | NDZ1001 INV0108 20060804 163500.ZIP | 31.5 | CDRZIP |
| 7/7/2006 3:54:22 PM | 1001 | NDZ1001 INV0078 20060707 153007.ZIP | 1.2 | CDRZIP |

*FIG. 22C*

SYSTEM AND METHOD FOR MANAGING A TELECOMMUNICATIONS NETWORK

CROSS REFERENCE TO RELATED APPLICATIONS

This application relates to, and claims the benefit of the earlier filing date and priority of U.S. Provisional Patent Application No. 60/904,165, filed Mar. 1, 2007, and entitled "System and Method of Managing a Telecommunications Network."

FIELD OF THE INVENTION

The present invention relates to a system and method for managing a telecommunications network. More particularly, the present invention relates to a system and method of a user of telephony services to manage a long-distance network as part of a telecommunications network using, for example, an online accessible resource kiosk, such as the ANI Networks Resource Kiosk (ARK).

BACKGROUND OF THE INVENTION

Businesses depend on getting access to their lines to traffic, and keeping them trafficking. Users of telephony services desire a system that can provide the carrier functionality that the user's long-distance business needs to succeed, in one place, available to the user virtually 24 hours a day, 7 days a week.

Other network providers fail to deliver an expeditious and effective user experience for managing their telecommunications networks. Other network providers do not do everything needed to retrieve and store the user's minutes on the network. Other network providers fail to provide essential features so that managing long-distance networks is burdensome for the user. Other network providers typically only provide data (e.g., financial, provisioning, line loss, call event distribution or trending functions) in files, requiring the customer to tediously create their own reports. Other network providers require the user to harvest their own customer base and submit it in a traditional form, requiring additional time and expense for the user. Other network providers do not provide online access to service agreements, which requires the customer to refer to soft or hardcopy of their agreement outside of any online facility. Other network providers require that all changes to service agreements be submitted via email or in writing, causing delays in when the changes take effect. Other network providers either do not provide online reporting or limit the amount of data being reported. Other network providers do not provide an online solution for creating and viewing status of maintenance activity. Other network providers do not provide an online means to transmit and save documentation, for example, a Letter of Agency/Authorization for maintenance. Other network providers provide troubleshooting guides that are not integrated into their trouble ticketing systems. Other network providers do not provide current Call Detail Report (CDR) data in their online systems. Other network providers do not provide online access to their Feature Group D footprint. Other network providers require that rate disputes be submitted in writing. Other network providers do not provide an online means to view contracted rates or other information associated with telephony service provided to a user.

Accordingly, there is need for new and improved systems and methods for efficiently, easily, and inexpensively providing a variety of long-distance network services and network management functions over telecommunications networks; and providing a network system architecture which allows adaptability without the need for extensive reconfiguration of a network.

SUMMARY OF THE INVENTION

Beyond a mere website provided by other network providers, the exemplary embodiments of a system and method for managing a telecommunications network may let a user take control of long-distance assets by including a robust set of features for integrated management of the user's network services. An exemplary system may include a CEO Dashboard, a Migration Module, and a Trouble Ticket Wizard. Additionally, the exemplary system may include backend processes that periodically run, ensuring that everything is being done to retrieve, and store, the user's minutes on the network. The exemplary system and method for managing a telecommunications network are adaptive, and are not limited to the exemplary embodiments described herein.

The exemplary system may be an integrated platform that includes functions such as provisioning, billing, line management, and account management, all in one place. If the user wants to verify a line is trafficking, the user may look it up and view, for example, the 25 most recent call events for that line, even calls completed just a few minutes before. Also, the user may check on the status of an uploaded order file and login and go to an Electronic Data Interchange (EDI) Manager to see a real-time file processing status. In fact, the exemplary system may be an integrated system that is used to service customers as well as communicate with telecommunications switches.

Because existing systems and method for managing telecommunications networks do not include many of the features of the exemplary system and method, managing long-distance networks is burdensome. For example, the CEO Dashboard may allow a user to manage their business by displaying financial, provisioning, line loss, call event distribution and trending functions. The user may also customize the CEO Dashboard to suit their needs. Other network providers typically provide this data in files requiring the customer to tediously create their own reports.

One exemplary system may be provided for enabling management of long-distance networks that includes at least one module. The module may comprise at least one of a migration, profile, maintenance, PIC Matrix, finance, and billing modules. The modules may be accessed via a CEO Dashboard. A method may be provided for managing networks that may include accessing a kiosk and interfacing with telecommunications modules via a CEO Dashboard.

The exemplary system may include the Migration Module, which provides for the migration of the user's existing customer base to the exemplary system using existing CDR data. Furthermore, a Reporting Module may provide the customer with a substantially real time view on the progress of the migration. Other network providers require the user to harvest their own customer base and submit it in a traditional form, requiring additional time and expense for the user.

The exemplary system may include a Profile Module. The Profile Module may allow the user to view their Master Service Agreement and any addendums within an online tool. Other network providers do not provide online access to service agreements, which requires the customer to refer to soft or hardcopy of their agreement outside of any online facility. The Profile Module may also allow the user to customize notifications and determine when and who should receive notifications and any changes may take effect immediately. Other network providers require that all changes be submitted via email or in writing, causing delays in when the changes take effect.

The exemplary system may include the Reporting Module. The Reporting Module allows the user to create, view, and download ad hoc reports about their end users. All data stored in the exemplary system records may be available for reporting. Other network providers do not provide either online reporting or limit the amount of data being reported.

The exemplary system may include a Maintenance Module that includes tollfree maintenance, and tollfree work orders. These features allow the user to request manual work without submitting a fax or email order. Status of the work orders may be delivered within the exemplary system. Other network providers do not provide an online solution for creating and viewing status of maintenance activity.

The Maintenance Module may also allow the user to upload a Letter of Agency/Authorization directly into the exemplary system for processing and further review. This data may be archived within the exemplary system should they need to review it. Other network providers do not provide an online means to transmit and save this important documentation.

Furthermore, the Maintenance Module may allow the user to troubleshoot an end-user problem while they are creating a trouble ticket. This functionality ensures that only valid trouble tickets are submitted to the exemplary system, which provides quicker resolution of the end-user problem. Users may also select a call example to attach to the end-user trouble ticket. Other network providers provide troubleshooting guides that are not integrated into their trouble ticketing systems. The Maintenance Module may also include a feature for providing a user online access to, for example, the last 25 network events for each of their end-users. Other network providers do not provide current CDR data in their online systems.

The exemplary system may include a Preferred Primary Interexchange Carrier (PIC) Module. The Preferred Primary Interexchange Carrier (PIC) Module may offer a user access to an On Network Feature Group D footprint at an NPA-NXX level. Other network providers do not provide online access to their Feature Group D footprint. Requests for this information to the other network providers must be made in writing.

The exemplary system may also include a Finance Module. The Finance Module may allow a user an online option to select a billed call type and dispute the rate at which it was billed. After the dispute is reviewed, if approved, the dispute amount may be automatically calculated based on the Call Type and Call Transport. Other network providers do not provide an online solution for rate disputes; instead all disputes must be submitted to the network provider in writing, either fax or email.

The exemplary system may include a Billing Module to provide the user online access to contracted rates. Other network providers do not provide an online means to view this important documentation.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference numerals refer to like elements. The drawings are exemplary only, and should not be construed as limiting the invention.

FIGS. 13A and 13B are an exemplary CEO Dashboard screen shot of a user interface in accordance with the embodiment of the present invention shown in FIG. 2.

FIG. 14A is an exemplary Admin Module screen shot of a user interface displaying Users information in accordance with the embodiment of the present invention shown in FIG. 2.

FIG. 15A is an exemplary Migration Module screen shot of a user interface displaying Upload Migration CDR information in accordance with the embodiment of the present invention shown in FIG. 2.

FIG. 16C is an exemplary Profile Module screen shot of a user interface displaying Network Assigned Provisioning (NAP) information in accordance with the embodiment of the present invention shown in FIG. 2.

FIG. 16D is an exemplary Profile Module screen shot of a user interface displaying ANI Carrier Description (ACD) information in accordance with the embodiment of the present invention shown in FIG. 2.

FIG. 16E is an exemplary Profile Module screen shot of a user interface displaying Provisioning Allowed States (SAP) information in accordance with the embodiment of the present invention shown in FIG. 2.

FIG. 16F is an exemplary Profile Module screen shot of a user interface displaying Sample Placement of Provisioning Offered States (POS) information in accordance with the embodiment of the present invention shown in FIG. 2.

FIG. 17B is an exemplary Reporting Module screen shot of a user interface displaying Report Requester information in accordance with the embodiment of the present invention shown in FIG. 2.

FIG. 17C is an exemplary Reporting Module screen shot of a user interface displaying Report Viewer in accordance with the embodiment of the present invention shown in FIG. 2.

FIG. 19C is an exemplary Maintenance Module screen shot of a user interface displaying Trouble Ticket Maintenance information in accordance with the embodiment of the present invention shown in FIG. 2.

FIG. 20A is an exemplary Finance Module screen shot of a user interface displaying View Transactions information in accordance with the embodiment of the present invention shown in FIG. 2.

FIG. 20B is an exemplary Finance Module screen shot of a user interface displaying View All Charges information in accordance with the embodiment of the present invention shown in FIG. 2.

FIGS. 20D and 20E are an exemplary Finance Module screen shot of a user interface displaying Carrier Dispute Request Information in accordance with the embodiment of the present invention shown in FIG. 2.

FIG. 21 is an exemplary Resources Module screen shot of a user interface displaying Forms Library information in accordance with the embodiment of the present invention shown in FIG. 2.

FIG. 22B is an exemplary Billing Module screen shot of a user interface displaying Invoice Delivery information in accordance with the embodiment of the present invention shown in FIG. 2.

FIG. 22C is an exemplary Billing Module screen shot of a user interface displaying Invoice CDR Delivery information in accordance with the embodiment of the present invention shown in FIG. 2.

DETAILED DESCRIPTION OF PREFERRED EMBODIMENTS OF THE INVENTION

Reference will now be made in detail to system and method embodiments of the present invention, examples of which are illustrated in the accompanying drawings. As embodied herein, the present invention may include various systems and methods for managing a telecommunications network.

Figure 1:
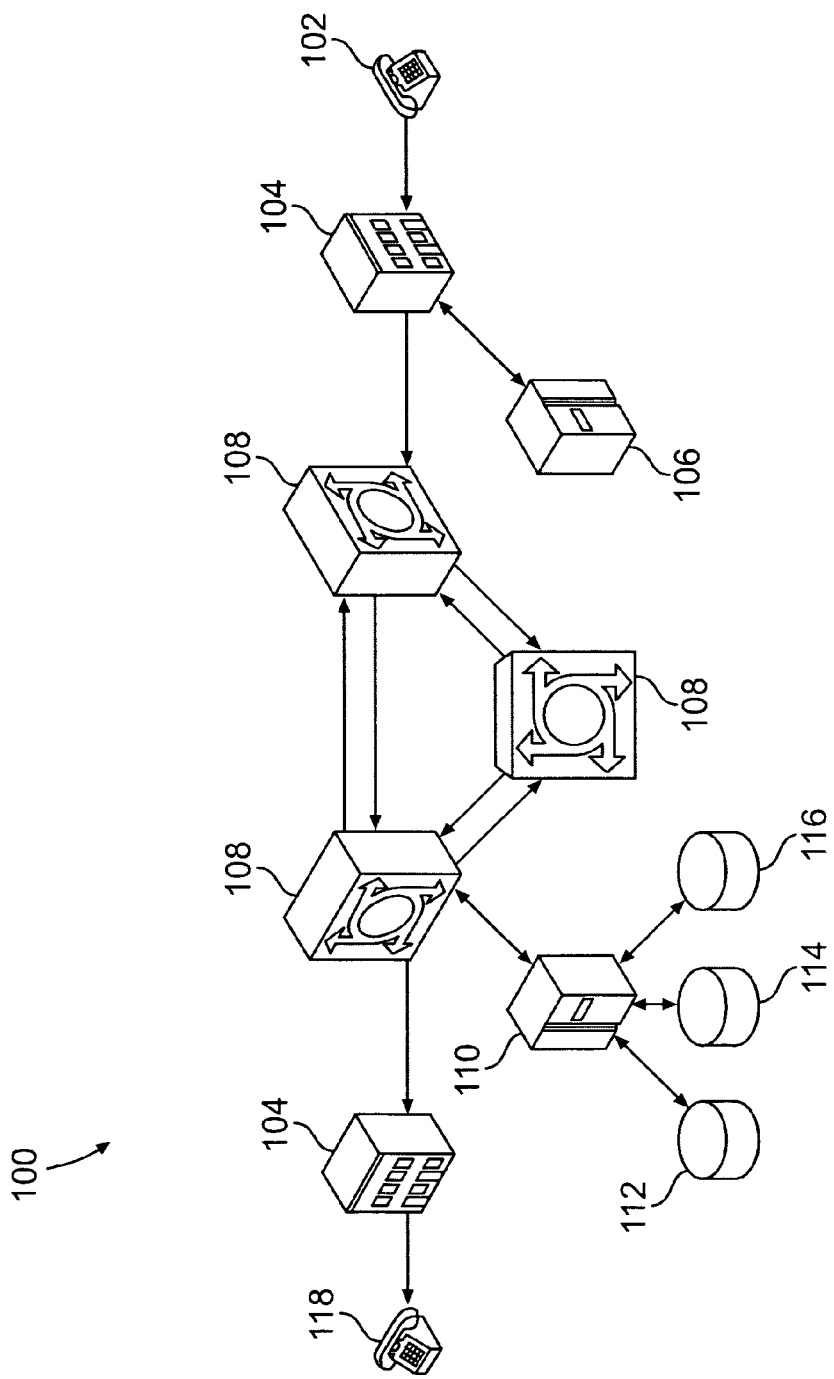
FIG. 1 is a schematic diagram of an operating environment for an exemplary system for managing a telecommunications network.

FIG. 1 is a schematic diagram of an operating environment 100 for an exemplary system for managing a telecommunications network. A calling party 102 originates a call with a local facility 104, which may access a Service Management System (SMS) database 106. The local facility 104 may hand off the call to a network that includes one or more switches 108. The network of switches hand off the call to another local facility 104 that terminates the call from the calling party 102 to the end-user 118. The network of switches 108 may be connected to a resource kiosk 110 maintained on a server, which may access one or more databases, such as a provision database 112, a care database 114, a CDR database 116 and/or other databases. The databases may be organized in different ways and stored in various places in the operating environment 100. For example, one or more databases may be stored on resource kiosk 110. Each database may include data for many different tables. For example, the care database 114 may include data for tables such as, customer tables, account tables, outbound Working Telephone Number (WTN), toll free numbers, pending toll free, pending outbound, and the like.

The resource kiosk 110 may store and execute computer program products for exemplary methods of managing a telecommunications network. The methods may include, for example, providing a user interface, daily CDR delivery, electronic PIC and care batch filing and individual file processing, and executive reporting and management tools. The resource kiosk 110 may, for example, include the following: an operating system (e.g., Windows® XP), a central processing unit (CPU), (e.g., Intel® Pentium® 1.0 GHz), a browser (e.g., Internet Explorer), system memory (RAM) (e.g., 256 MB), a display (e.g., screen resolution of 1024×768, 32-bit color), Internet access (e.g., 128 kbps, JavaScript enabled, pop-up blockers set to "off"), a document viewer (e.g., Adobe Reader®), a standard software suite (e.g., Microsoft® Office), and utility programs (e.g., WinZip®).

The operating environment 100 may provide switchless 1+ service for long distance calls originating from anywhere in the continental United States and may provide switchless toll free service for calls originating from anywhere in the United States, Canada, the US Virgin Islands and Puerto Rico. The operating environment 100 may include a Feature Group D network and the network may include overlapping on-net and off-net coverage supported by tier one carriers. The network may include a SS7 network with TDM and VoIP switches. Customer CIC translation to Feature Group D facilities may originate in many locations with tandem trunking to many Local Exchange Carrier (LEC) end offices. The network may include network monitoring.

Figure 2:
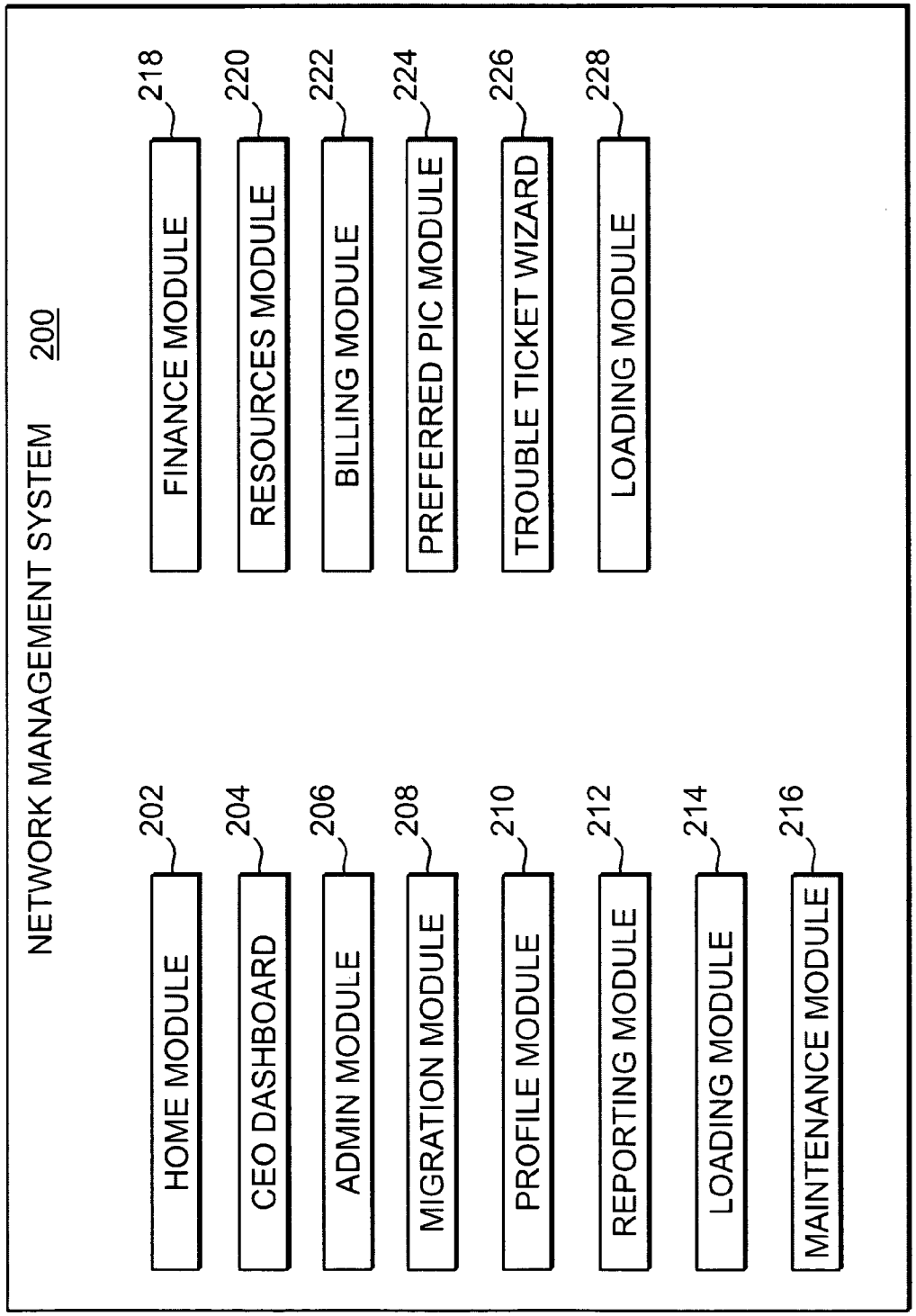
FIG. 2 is a block diagram of an exemplary system for managing a telecommunications network.

FIG. 2 is a block diagram of an exemplary system 200 for managing a telecommunications network online through a web based and accessible tool. The exemplary system 200 may be designed and implemented as computer program products stored and executed on the resource kiosk 110 of FIG. 1 in various ways, such as the modular decomposition illustrated in FIG. 2. The particular modules in the exemplary system 200 of FIG. 2 are for illustration and other embodiments may include more, less or different modules or even various other designs and implementations. For example, some of the exemplary methods may be stored and executed as procedures in one or more of the databases 112, 114, 116 of FIG. 1. The exemplary system 200 of FIG. 2 includes the following modules, home module 202, CEO Dashboard 204, Admin Module 206, Migration Module 208, Profile Module 210, Reporting Module 212, Loading Module 214, Maintenance Module 216, Finance Module 218, Resource Module 220, Billing Module 222, Preferred PIC Module 224, Trouble Ticket Wizard 226, and Loading Module 228.

The CEO Dashboard 204 may allows the user to manage all of the user's long distance traffic in one place. The CEO Dashboard 204 may automatically provide user financial, provisioning, line loss, call event distribution, and trending reports on a customized display.

The Migration Module 208 may be used to manage the migration of the user's customer base to the network using existing CDR data. The Migration Module 208 may provide substantially real time status of the progress of the user's customer migration at the individual ANI level.

The Profile Module 210 may allow the user to view a Master Service Agreement and all addendums.

The Billing Module 222 may allow the user to customize all notifications and designate when and who should receive such notices. Changes may be made online and may take effect immediately.

The Finance Module 218 may allow online access to contracted rates with the network service. There also may be an online option to select a billed call type and dispute the rate at which it was billed. When the dispute is reviewed, if approved, the dispute amount may be automatically calculated and communicated through the online tool based on the call type and call transport.

The Reporting Module 212 may allow the user to create, view, and download ad hoc reports about the user's traffic as a whole or for an end-user.

The Maintenance Module 216 is for network or Tollfree Maintenance. The user may request manual work without submitting a fax or email order and view the status of all pending work orders. The Maintenance Module 216 may allow the user to upload a Letter of Agency/Authorization as a direct upload into PIC processing. This data may be archived with the exemplary system 200 should the exemplary system 200 need to retrieve it for future Moves, Adds or Changes (MAC's).

The Trouble Ticket Wizard 226 may use intuitive diagnostic tools in the exemplary system 200 to troubleshoot end-user issues when creating a trouble ticket and speed up resolution.

The Preferred PIC Module 224 may allow online access to the network's On-Net feature Group D footprint at an NPA-NXX level.

The modules in the exemplary system 200 shown in FIG. 2 may be used to provide the exemplary methods illustrated in FIGS. 3A to 11 and the screen shots for the exemplary user interface illustrated in FIGS. 12 to 22C. These exemplary systems and methods are not intended to be limiting, but merely illustrative of the inventive concepts.

FIGS. 3A to 11 illustrate exemplary methods for implementing the exemplary system 200 of FIG. 2.

Figure 3A:
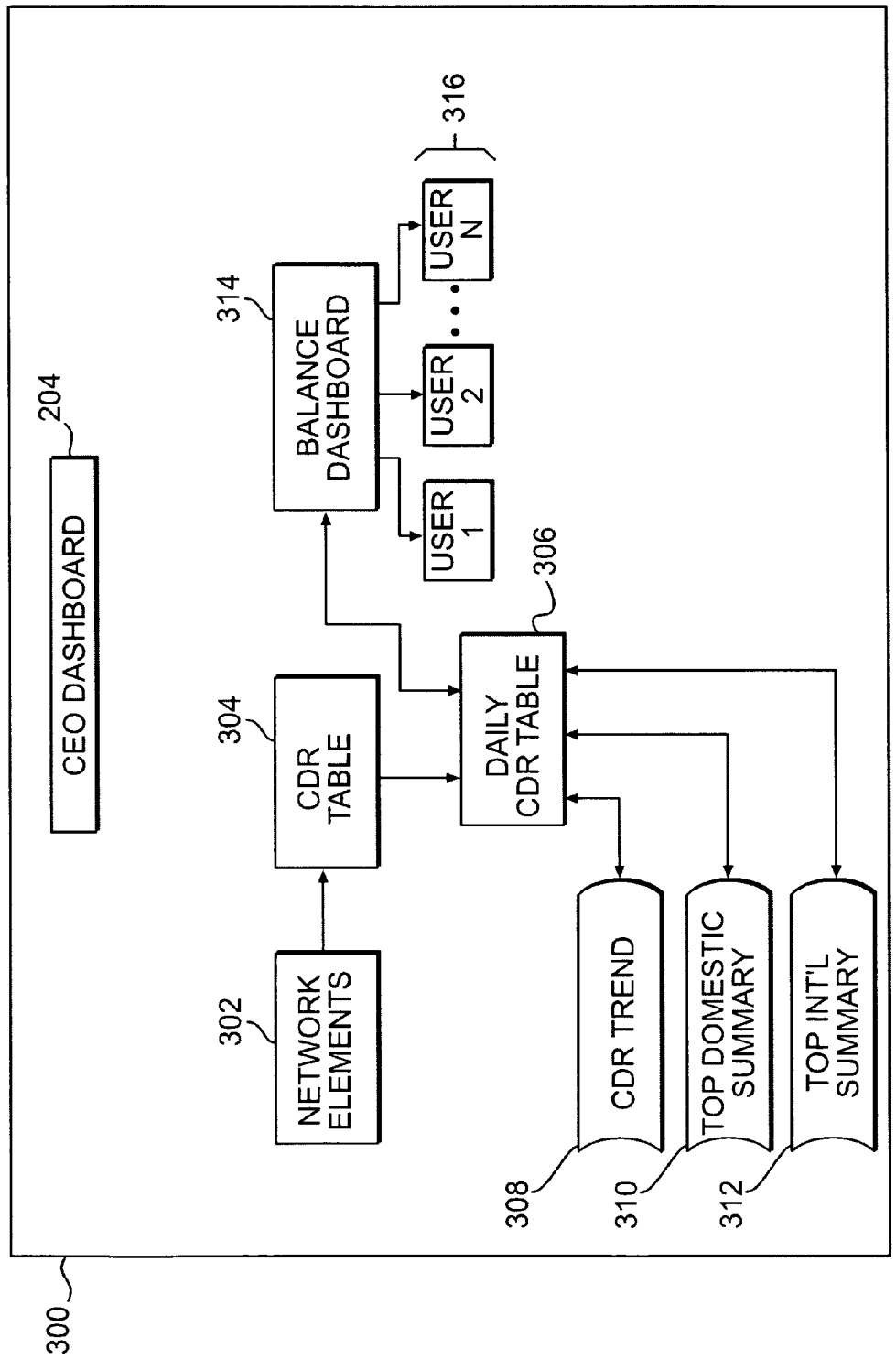
FIG. 3A is a chart illustrating data flow for gathering Call Detail Report (CDR) information for the embodiment of the present invention shown in FIG. 2.

FIG. 3A is flow chart of an exemplary method 300 for gathering Call Detail Report (CDR) information for the CEO Dashboard Module 204 of the system of FIG. 2. For each new user, the user's customer base (i.e., end-users) may be is provisioned for carrying calls over the network. The results of the provisioning process may be displayed on various gauges and in various reports (see FIGS. 13A, 13B and 17A-C). After the user is on the network and the user's customers are making calls, CDR information may be gathered by the exemplary system 200. The CDR information gathered for each call may not only used by the exemplary system 200 for billing but also to provide information to the user to help the user manage their business.

In the exemplary method 300, one or more network elements 302 may periodically (e.g., every 5 minutes or when a file reaches capacity) create and send a file (e.g., a binary file of CDR records) to the exemplary system 200. The exemplary system 200 may receive each file and import the file into a CDR table 304. The CEO Dashboard Module may periodically looking for new files in the CDR table 304. As a result of identifying one or more new files the CEO Dashboard Module may assign a customer for each new file and update a Daily CDR table 306. Updates to The Daily CDR table 306 may initiate other processes to compile additional information for the CEO Dashboard Module 204. These other processes may include a CDR trend process 308, a top domestic summary process 310, and a top international summary process 312. As a result, the Daily CDR table 306 may store current, rated, customer account assigned CDRs that are ready for billing. CDR information may be updated, for example, every fifteen minutes, giving the user a window of compiled and analyzed data to manage the user's business. Another process, the balance dashboard process 314 may use the CDR information to update the CEO Dashboard Module 204 and, for example, display information on a user interface that is unique for each user 316.

Figure 3B:
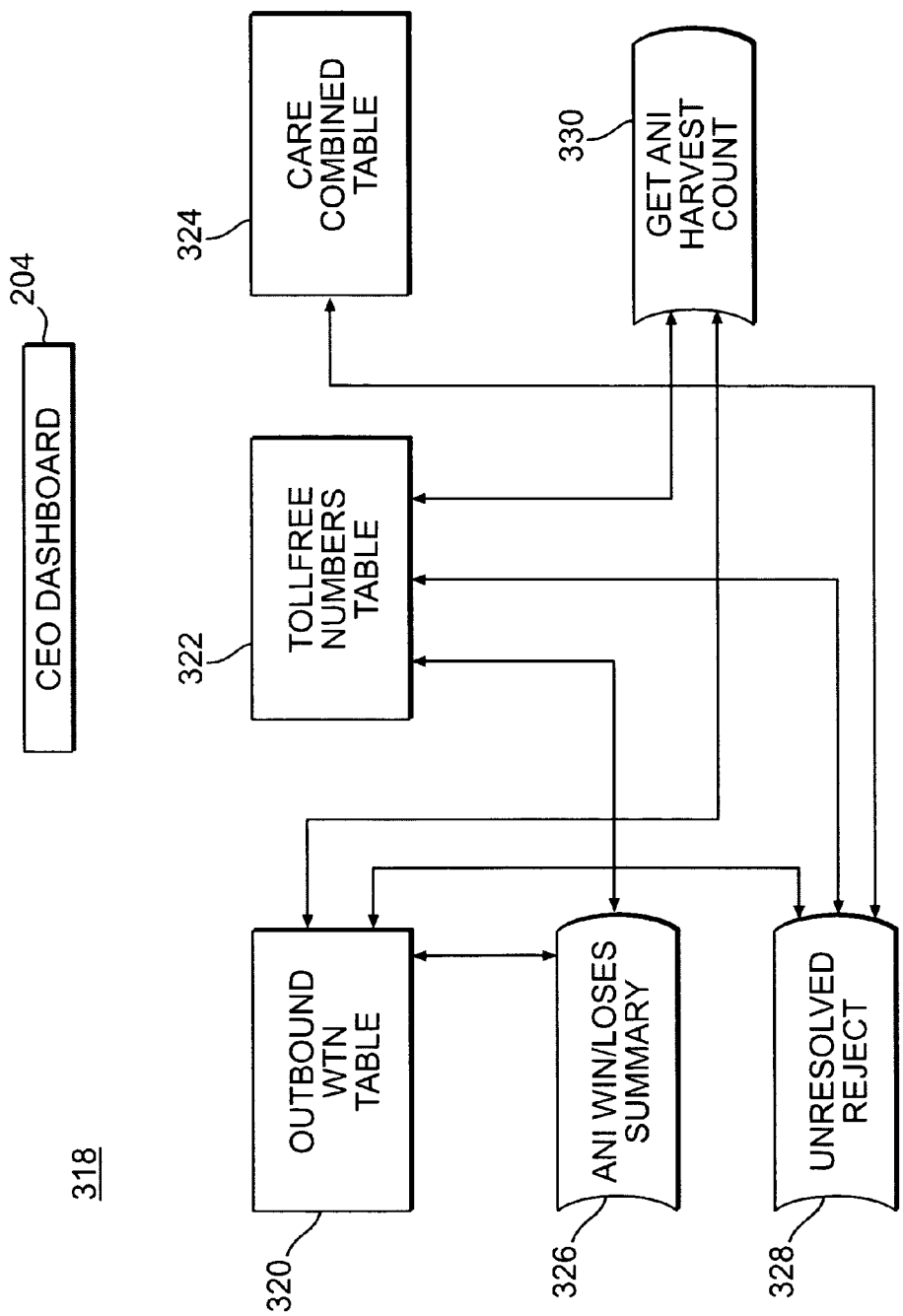
FIG. 3B is a chart illustrating data flow for gathering Care information for the embodiment of the present invention shown in FIG. 2.

FIG. 3B is a schematic chart of exemplary interconnections of tables and program segments 318 for gathering Care information for display by the CEO Dashboard Module 204 of the system of FIG. 2. In order to provide the CEO Dashboard Module with current information several tables may be maintained in the care database 114 and/or the provisioning database 112, namely, an outbound WTN table 320, a toll free numbers table 322, and a care combined table 324. Other tables and databases may also be maintained to provide the CEO Dashboard Module with information to be displayed. A ANI win/loss summary process 326 may be run to maintain current data in tables 320, 322 and 324, periodically (e.g., nightly) to provide Care information that may be displayed by the CEO Dashboard Module 204, for example, on a 30 Day Lost ANI gauge. An unresolved reject process 328 may also run periodically to maintain current data in tables 302, 322 and 324, to provide Care information that may be displayed by the CEO Dashboard Module 204, for example, on an Unresolved Rejects gauge. A get ANI harvest count process 330 may run periodically (e.g., upon every query of the CEO Dashboard user interface) to maintain current data in tables 320 and 322 to provide Care information that may be displayed by the CEO Dashboard Module 204, for example, on a 30 Day Summary Reports gauge. The Care information may include provisioning information as well. The Care information correspond to a specified timeframe, such as, for example, the time the user began service with the network to the present. The Care information may be custom specified by an individual user to include any information about the telephone numbers that the user controls that helps the user to manage the user's business.

In FIG. 3A, the CDR Table 304 may comprise, for example, any of the following data: Record Identifier, CDR Summary Identifier, Customer Identifier, Account Identifier, Carrier Identifier, Carrier Account Number, Sequence Number, Call Date, Call Time, Bill To WTN, Translate WTN, Originating WTN, Originating LATA, Originating OCN, Originating City, Originating State, Originating Country Code, Terminating WTN, Terminating LATA, Terminating OCN, Terminating City, Terminating State, Terminating City Code, Terminating Country Code, Call Type, Call Transport, Duration, Rounded Duration, Talk Time Duration, Account Code, Info Digits, Route Choice, Class Of Orig Trunk, Originating Trunk Group, Terminating Trunk Group, Final Terminating Trunk Group, Answer Supervision Flag, Final Status, and CIC.

In FIG. 3A, the Daily CDR Table 306 may comprise, for example, any of the following data: customer id, workdate, recent calls, recent duration, baseline calls, baseline duration, percent calls, and percent duration.

In FIG. 3B, the Outbound WTN Table 320 may comprise, for example, any of the following data: WTN ID, Customer ID, Account ID, BTN, WTN, Line Type, Date Sent, First Call Date, Last Call Date, Date Entered, Who Entered, Account Code Digits, Validated Account Codes, Account Type, LEC Response Date, LECTCSI Interlata, LECTCSI Intralata, Carrier Response Date, Carrier Response Interlata, Carrier Response Intralata, PIC Type, PIC, LPIC, International Blocking, Routing Indicator, Send To LEC, NPA Split End Date, Physical Name and Address, WTN Status, WTN Status Date, WTN Status By, Last 700 Test Date, WTN Status Old, Date Added To Customer, Send Sequence, Begin Service Date, End Service Date, Ok To Send, LOA Date, LOA Required, Cdr Migration Id, and WTN Action.

In FIG. 3B, the Tollfree Numbers Table 155 may comprise, for example, any of the following data: Tollfree ID, Customer ID, Account ID, Tollfree Number, Translate Number, Translate BTN, Resp Org Release Date, Resp Org Release Code, Resp Org Release Who, Resp Org Date, Reject Code, Date CIC Changed, Status 800, Resp Org, Previous Resp Org, Source Type, Enhanced, Pay Phone Blocking, Tollfree Status, Status By, Status Date, Date Added, Added By, Date Changed, Who Changed, Billing Name, Active Date, First Call, Last Call, Last Called By, Directory Listed, Routing, Trunk Group, Carrier, Area Of Service, LOA Date, Last Modified, Last Modified By, TollFree Status Old, Date Added To Customer, Ok To Send, Line Type, Date Sent, Send Sequence, Begin Service Date, End Service Date, and Cdr Migration Id.

In FIG. 3B, the Care Combined Table 324 may comprise, for example, any of the following data: Care identifier, Carrier Care identifier, Transaction Code, Status Indicator, BTN, WTN, Hunting Multiline Group Number, Transaction Date, Customer Type Indicator, Billing Name and Address, Jurisdictional Indicator, PIC Change Charge Indicator, CIC, Service Name and Address, LSPID Code, Disputed CIC, Carrier Response Code, and Process Date.

Figure 13A:
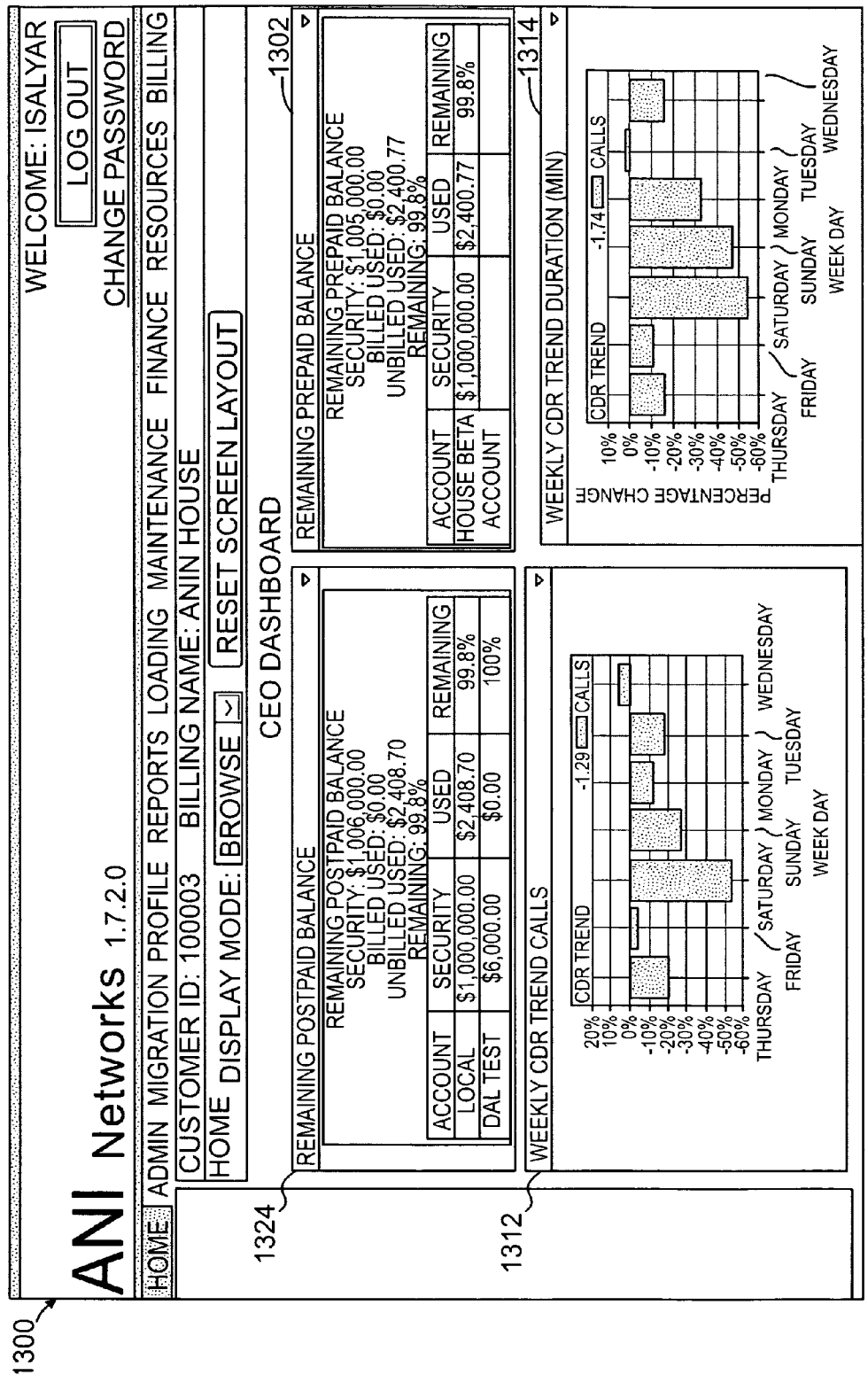

The CEO Dashboard Module may, for example, collect, process, store, and display any of the information described in Table 1 (See FIGS. 13A and 13B).

TABLE 1

Exemplary Data for the CEO Dashboard

| Information | Description |
|---|---|
| Remaining Prepaid Balance | This gauge shows how much of the user's deposit payment, per account, has been used. |
| Remaining Postpaid Balance | This gauge shows how much of a guaranteed amount, per account, has been used. |
| Top 5 International Destinations by Duration (last 30 days) | This gauge shows, using duration (in minutes), which countries the user's customers have called the most often within the last 30 days. |
| Top 5 International Destinations by Call Count (last 30 days) | This gauge shows, using call cont, which countries the user's customers have called the most often within the last 30 days. |
| Top 5 Domestic Destinations by Duration (last 30 days) | This gauge shows, using duration (in minutes), which states the user's customers have called the most often within the last 30 days. |
| Top 5 Domestic Destinations by Call Count (last 30 days) | This gauge shows, using call count, which states the user's customers have called the most often within the last 30 days. |
| Daily CDR Report | This gauge shows how many calls, for what total duration 9in minutes) and the estimated billable amount (in dollars) on a daily basis for the last week. |
| ANI Summary Report | This gauge shows, by jurisdiction, the total active toll frees as of midnight, how many were added, and how many were lost in the last 30 days as well as how many ANIs were active on the user's account 30 days ago. |
| Toll free Summary Report | This gauge shows, by jurisdiction, the total active toll frees as of midnight, how many were added, and how many were lost in the last 30 days as well as how many toll frees were active on the user's account 30 days ago. |
| Weekly CDR Report | This gauge shows the number of calls the user had on the stated day of the week as compared to the number of calls the user had on the same stated day of the prior week. |
| Weekly CDR Trend Duration | This gauge shows the total duration (in minutes) the user had on the last day of the week as compared to what the user had on the same weekday of the prior week. |
| Unresolved Rejects Summary Report | This gauge shows how many ANIs and toll frees have a reject code that has yet to be resolved. This gauge also breaks these rejects out into how long it has been since the reject was received and no subsequent action has been taken. |
| Daily CDR | This gauge shows how many calls, for what total |

TABLE 1-continued

Exemplary Data for the CEO Dashboard

| Information | Description |
| --- | --- |
| Report (8-14 Days) | duration (in minutes) and the estimated billable amount (in dollars) on a daily basis for the time period that was 8-14 days ago. |
| Daily CDR Report (15-30 Days) | This gauge shows how many calls, for what total duration (in minutes) and the estimated billable amount (in dollars) on a daily basis for the time period that was 15-20 days ago. |
| 30 Day Lost ANI Report | This gauge shows how many ANIs you have lost, based on LEC TCSI. |

Figure 4:
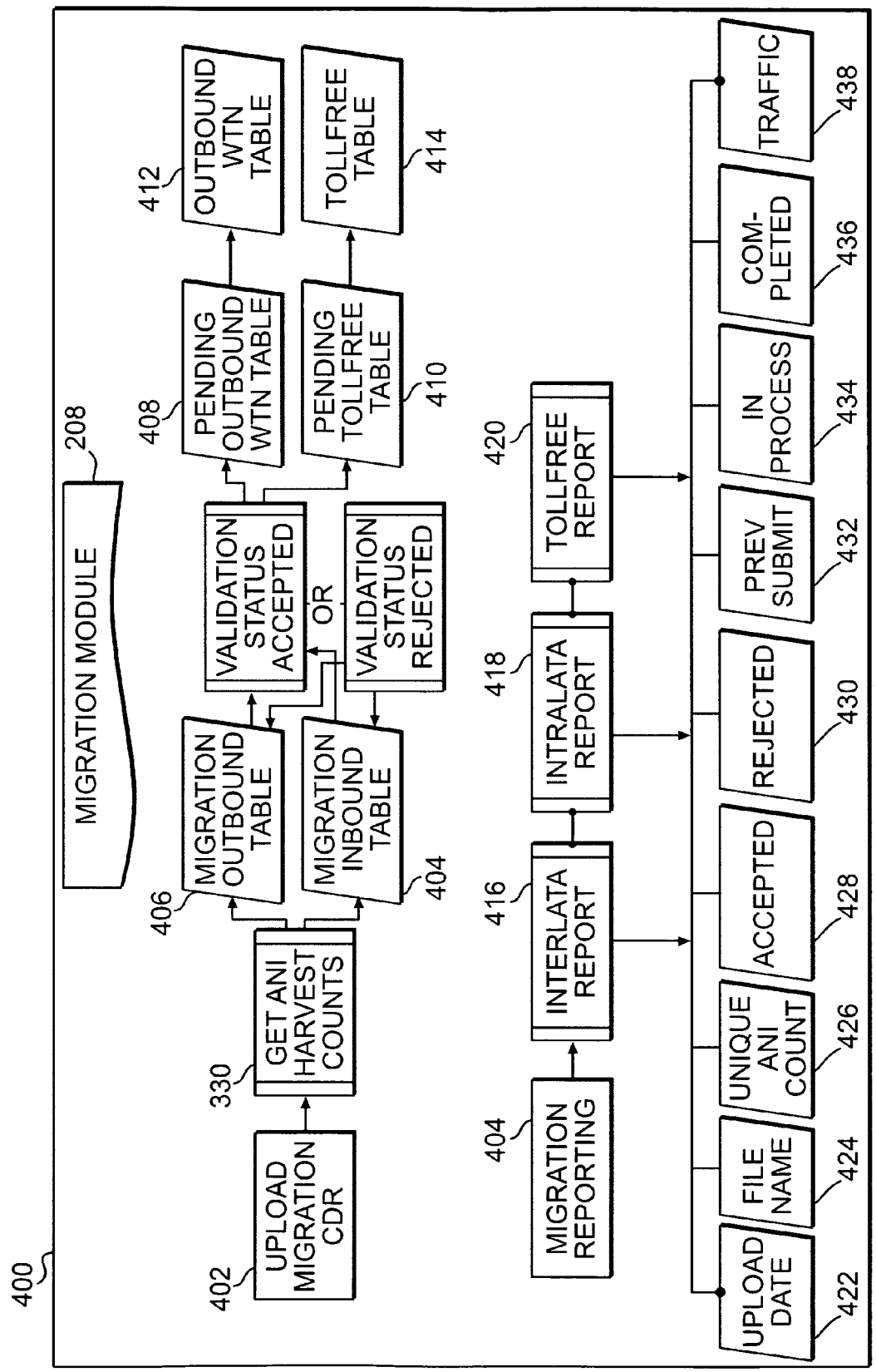
FIG. 4 is a flow chart of an exemplary method for providing Migration Module information in accordance with the embodiment of the present invention shown in FIG. 2.

FIG. 4 is a flow chart of an exemplary method 400 for providing the Migration Module 208 of the system of FIG. 2. This exemplary method 400 may include two processes: an uploading migration CDR process 402 and a migration reporting process 404. The uploading migration CDR process 402 may be performed for input in various different formats such as, for example, ANIN 184 Byte, Classic 402 Byte, GX 203 Byte, Qwest, Simple List, Simple BTN List & TF List, and any other user-defined format. Thus, the exemplary method 400 may be customized to accommodate various proprietary formats. These formats may be stored in a forms library in the exemplary system 200.

The get ANI harvest count process 330 of FIG. 4 may determine the format for the upload migration CDR process 402 and upload the data into various tables. Inbound toll free numbers may be uploaded into the Migration Inbound Table 404, while ANIs may be uploaded into the Migration outbound Table 406. This is because Inbound toll free numbers and ANIs may be provisioned differently. Depending on the results of validation, rejected data may remain in the tables 402, 404 and may be handled in the migration reporting process 404, while accepted data is being provisioned and then stored either in the pending Outbound WTN Table 408 or the Pending Toll free Table 410. Once the data is provisioned properly it may be stored in the Outbound WTN Table 412 or Toll free Table 414.

The migration reporting process 404 may allow the user to monitor the migration process. The migration reporting process 404 may be performed for three different types of reports: an InterLata Report 416, an IntraLata Report 418, and a Toll free Report 420. The user may select one of these reports on a user interface to trigger a query. Selection of the InterLata Report 416 or IntraLata Report 418 may cause a query to be sent to the Migration Outbound Table 406, Pending Outbound WTN Table 408 and Outbound WTN Table 412. Selection of the Toll free Report 420 may cause a query to be sent to the Migration Inbound Table 404, Pending Toll free Table 410 and Toll free Table 414. In this exemplary method 400, all three reports may include the following data: upload date 422, file name 424, unique ANI count 426 (i.e., unique identifier for an end-user having multiple CDR records) accepted 428, rejected 430 (e.g., including a reason why rejected), previously submitted 432 (i.e., phone number already migrated and provisioned), in process 434, completed 436, and traffic 438. The number of in process 434, completed 436 and traffic 438 added together should equal the number accepted 428. This may allow the user to monitor the provisioning process (in process) through to the care process (completed). Traffic 438 may indicate that a customer belongs to the user.

Figure 5A:
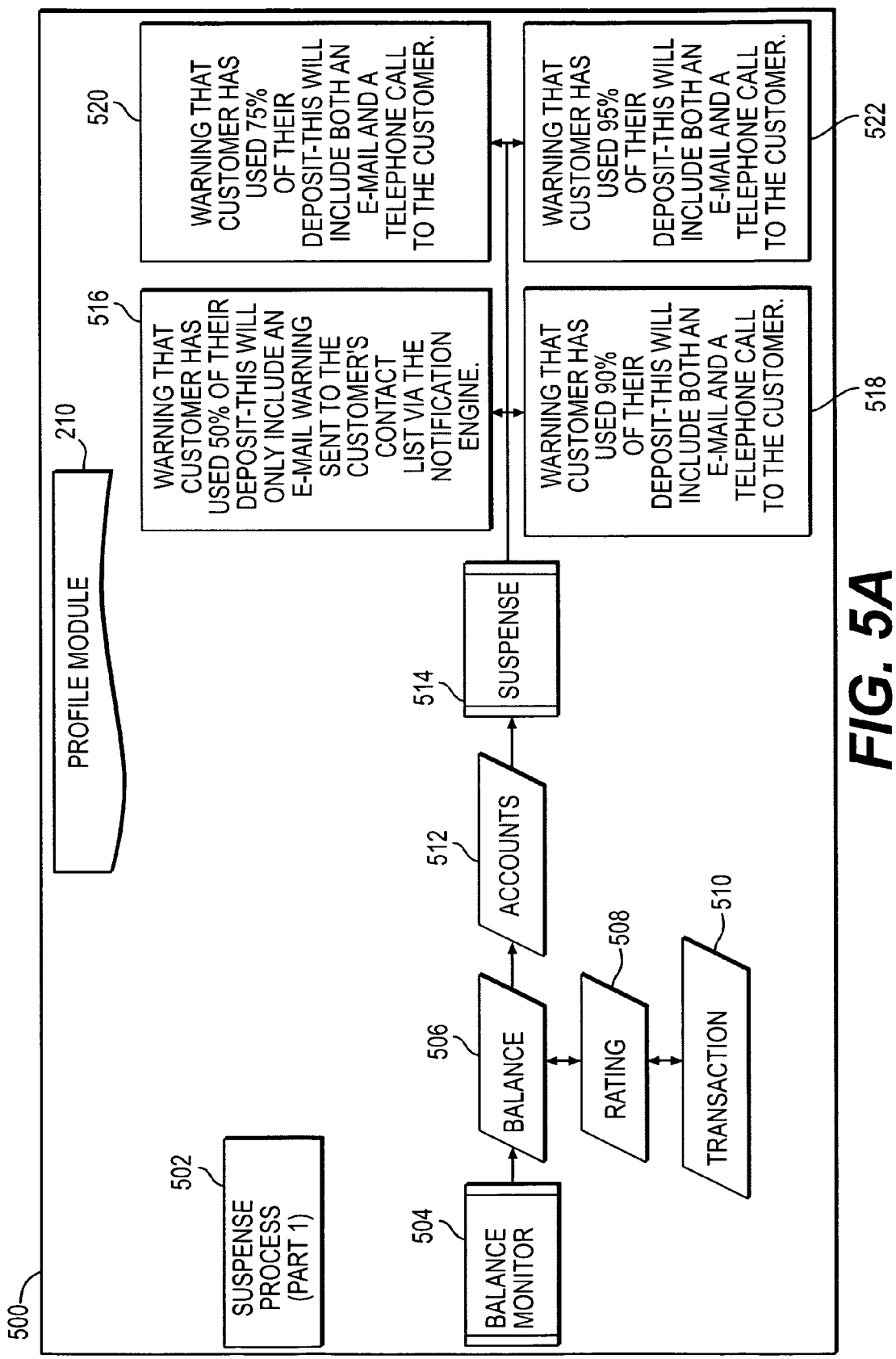
FIG. 5A is a flow chart of an exemplary method for providing a Suspense Process for a Profile Module in accordance with the embodiment of the present invention shown in FIG. 2.

FIG. 5A is a flow chart of an exemplary method 500 for providing a Suspense Process 502 for the Profile Module 210 of the system of FIG. 2. The exemplary method 500 for providing a Suspense Process 502 includes a balance monitor 504. The balance monitor 504 may be an automatic accounts receivable system that periodically (e.g., every 5 seconds) retrieves data from various tables, such as the Balance 506, Rating 508, Transaction 510, and Accounts 512 tables by, for example, performing a join. Service for an end-user may be suspended 514 and one or more of the warnings 516, 518, 520, 522 may be displayed on a user interface as a result.

Figure 5B:
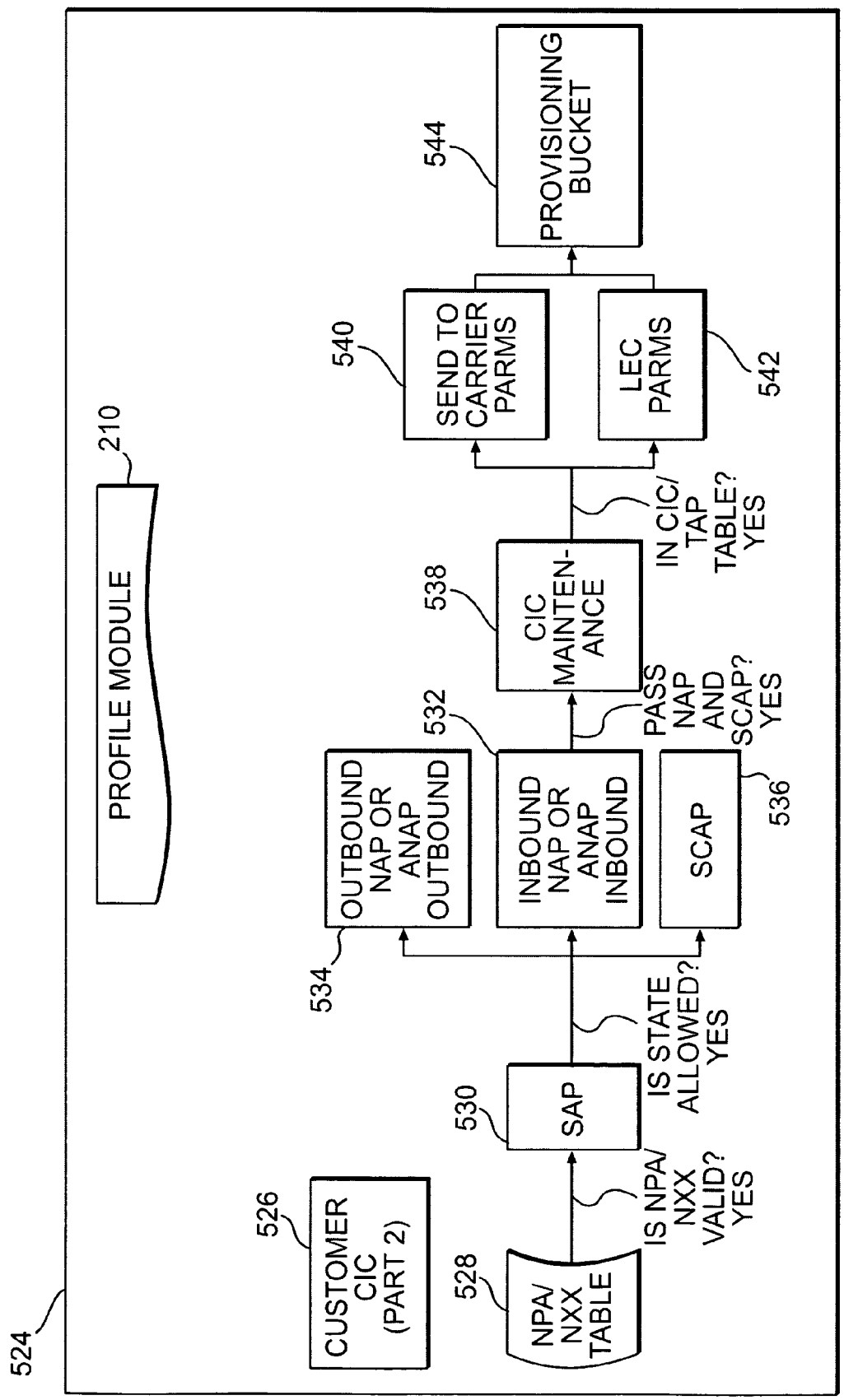
FIG. 5B is a flow chart of an exemplary method for providing Customer Carrier Identification Code (CIC) information for a Profile Module in accordance with the embodiment of the present invention shown in FIG. 2.

FIG. 5B is a flow chart of an exemplary method 524 for providing a Customer Carrier Identification Code (CIC) 526 for the Profile Module 210 of the system of FIG. 2. When a customer enters a phone number, the exemplary method 524 may check the NPA/NXX Table 528 (i.e., the area code and first three digits of the phone number) for validity. Next, the exemplary method 524 may check whether there is State Allowed Provisioning (SAP) 530. The SAP is a table that may appear on each customer/account's profile to allow wholesale operations to define the states in which that customer/account is allowed to provision. This information may be provided by the Profile Module 210 at the customer/account level on an account service information user interface. The SAP may be used to validate every ANI and Toll free Translate that is added to the network. The SAP may be used to restrict an account from loading WTNs/TFs or to provide state regulatory restriction.

If there is SAP for the phone number, one of three different kinds of provisioning may be used. If the phone number is a toll free number, either Inbound Network Allowed Provisioning (NAP) or Account Network Allowed Provisioning (ANAP) 532 may be used. The ANAPs are tables stored in the network that allow the network/wholesales operations group to maintain provisioning plans at the customer/account level. NAPs are tables stored in the network that allow the network/wholesale operations group to maintain provisioning plans at the network level and customer/account level (ANAP). There are two network level NAPs, one for Inbound (Toll free) and one for Outbound (ANI/WTNs). Every customer/account that does not have an ANAP may use the network NAPs. The network NAPs are also called the default NAPs.

If the phone number is a regular 1+ANI, Outbound NAP or ANAP Outbound 534 may be used. Otherwise, Switch Carrier Allowed Provisioning (SCAP) 536 may be used. SCAP is a table that allows the network/wholesale operations group to define, for example, the switches, carrier, products, and send requirements for a CIC in the NAP plans. Once a SCAP group is created and activated, it may be available network-wide. The exemplary method 524 for providing a CIC 526 may check the NAP and the SCAP at the same time. If the phone number passes, then the phone number passes to CIC Maintenance 538. CIC Maintenance 538 may determine the footprint, determine where to provision, determine if the phone number is on-net or off-net, and determine the kind of CIC. If the phone number passes CIC Maintenance 538, the Send Carrier Parameters 540 and LEC Parameters 542 interfaces may be run. The Send Carrier Parameters 540 interface may identify the network carrier's file send format requirements and build the send requirements for customer CIC and ACICs. The LEC Parameters 542 interface identifies the LEC Direct PIC file send format requirements to define network CGCs and participating customer CGCs. The Provisioning Bucket 544 may store provisioned phone numbers to be added to the network. If the ANI or Toll free fails any of these steps, an error message may be displayed on a user interface and the phone number may not be added to the network.

Figure 5C:
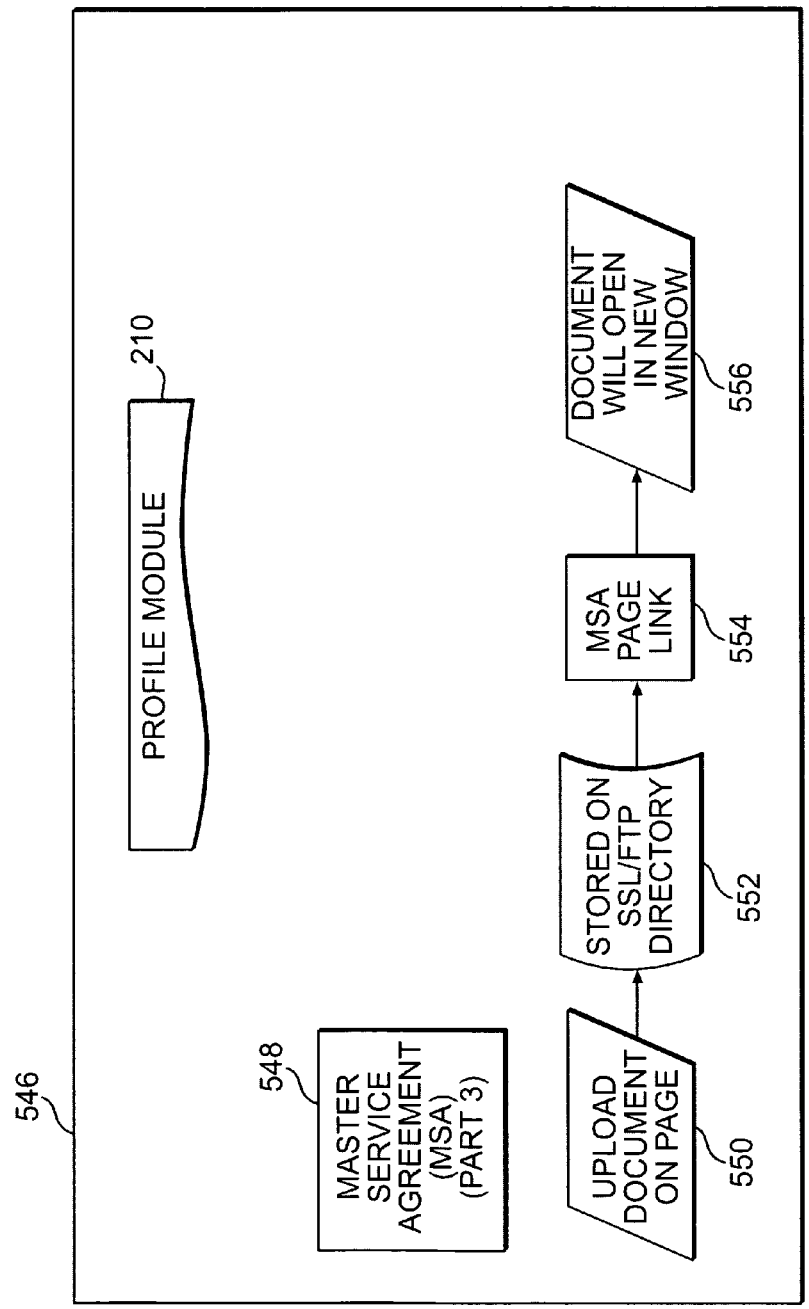
FIG. 5C is a flow chart of an exemplary method for providing a Master Service Agreement (MSA) for the Profile Module of the system of FIG. 2.

FIG. 5C is a flow chart of an exemplary method 546 for providing a Master Service Agreement (MSA) 548 for the Profile Module 210 of the system of FIG. 2. The exemplary method 546 provides an MSA 548 by uploading the MSA document 550, storing the MSA document (e.g., in an SSL/FTP directory) 552, and providing a link to the MSA document 554 in a user interface so that the MSA document opens, for example, in a new window 556. Other embodiments may provide different or additional documents online, such as non-disclosure agreements, rate increases or any other documentation or data that the user may need to store or access.

Figure 6:
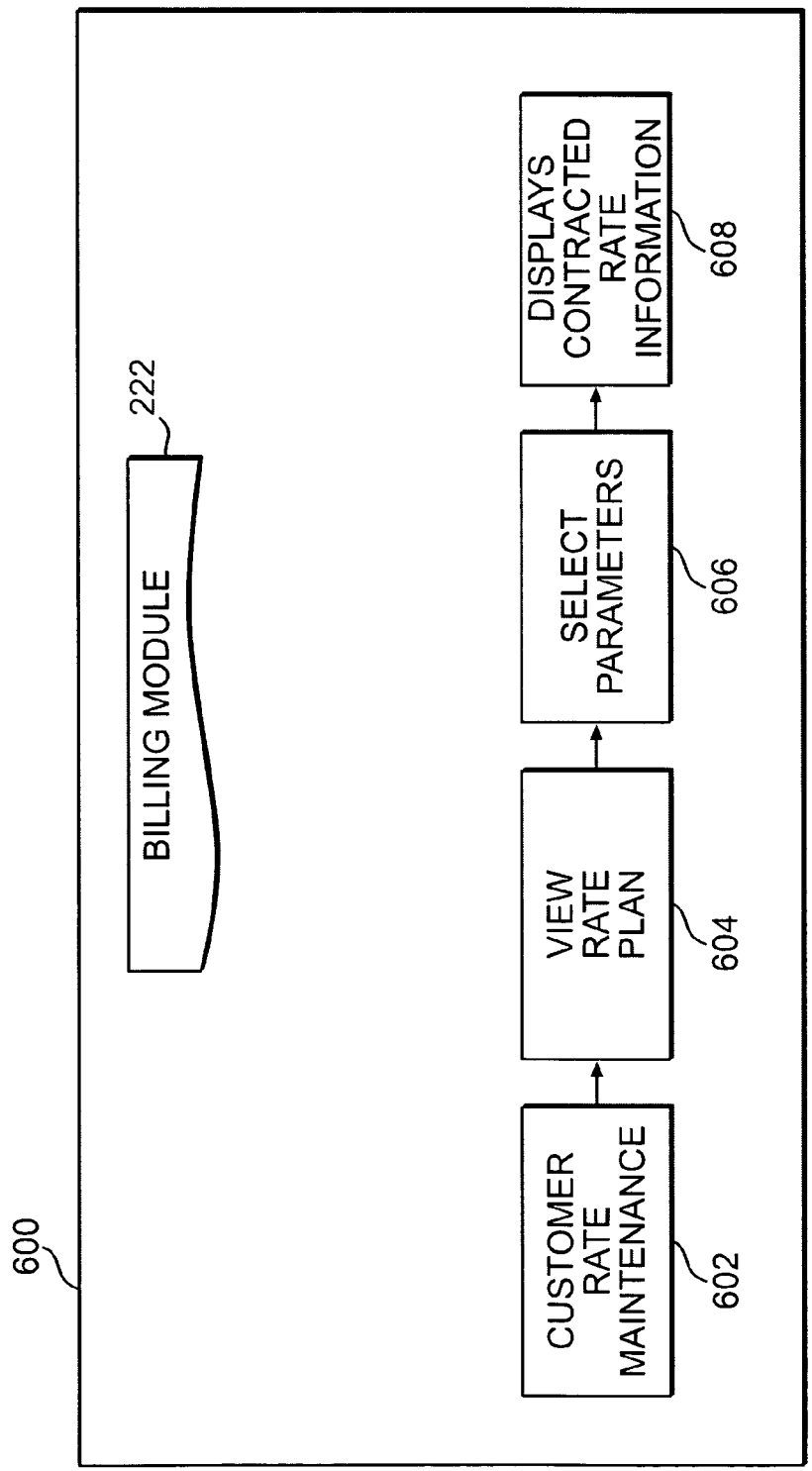
FIG. 6 is a flow chart of an exemplary method for providing Billing Module information in accordance with the embodiment of the present invention shown in FIG. 2.

FIG. 6 is a flow chart of an exemplary method 600 for providing the Billing Module 222 of the system of FIG. 2. This exemplary method 600 may perform customer (i.e., user) rate maintenance 602 by allowing the user to view the rate plan 604 and to select parameters 606, and then displaying the contracted rate information on a user interface 608.

Figure 7:
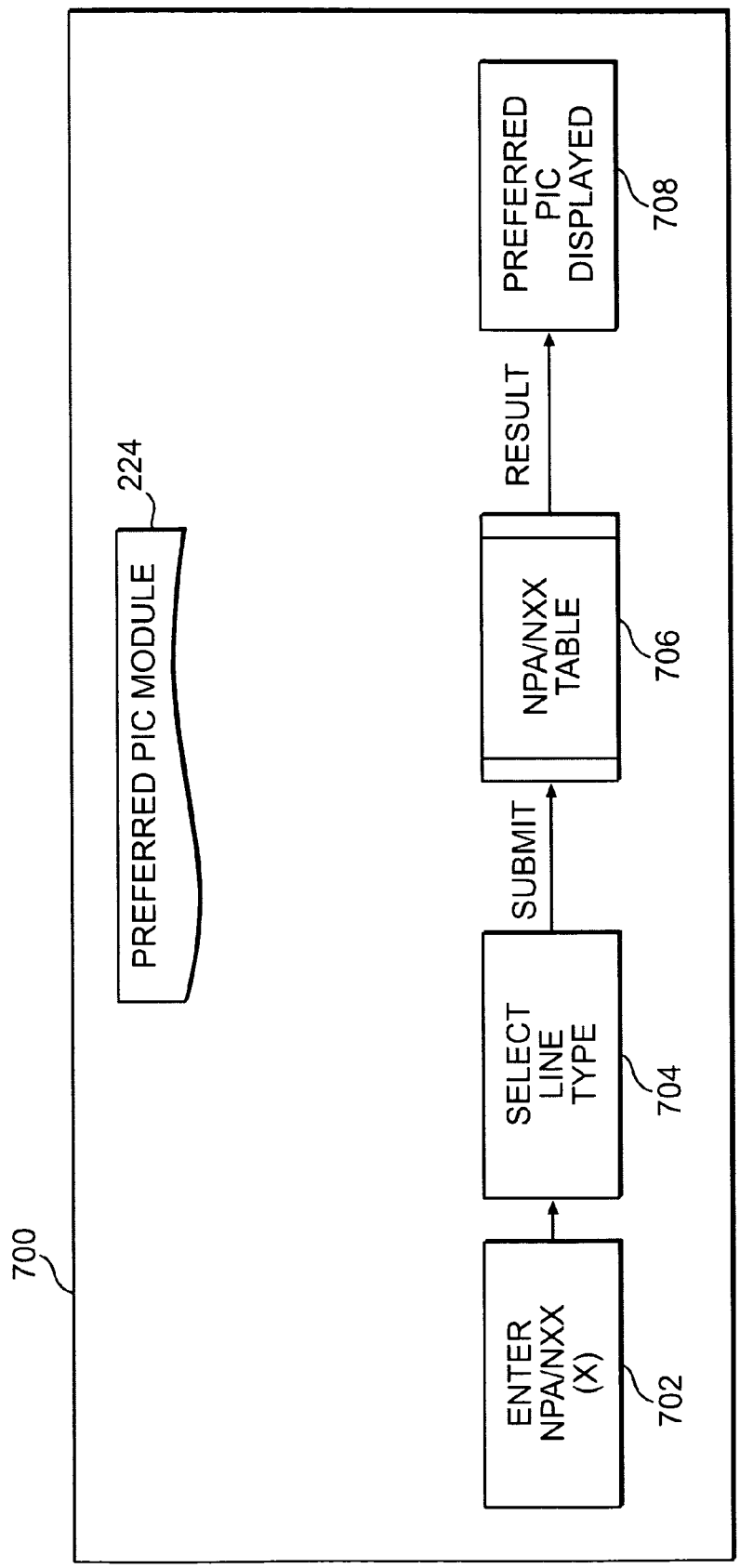
FIG. 7 is a flow chart of an exemplary method for providing Preferred Primary Interexchange Carrier (PIC) Module information in accordance with the embodiment of the present invention shown in of the system of FIG. 2.

FIG. 7 is a flow chart of an exemplary method 700 for providing the Preferred Primary Interexchange Carrier (PIC) Module 224 of the system of FIG. 2. In this exemplary method 700, once the user enters NPA/NXX (X) (i.e., part of the phone number) 702 and selects a line type 704, this information may be used to find the preferred PIC in the NPA/NXX table 706, which may be displayed on a user interface 708.

Figure 8:
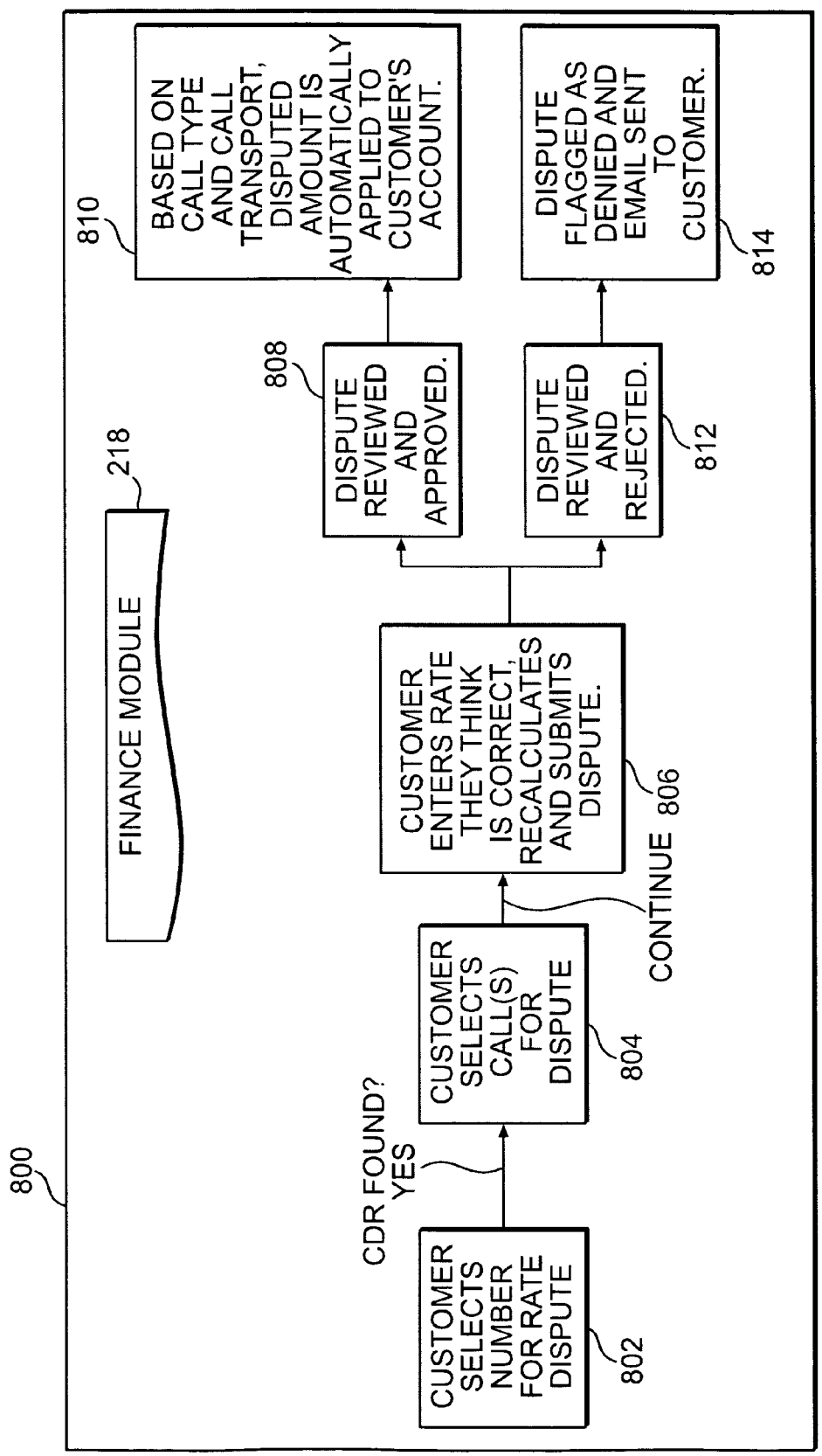
FIG. 8 is a flow chart of an exemplary method for providing Finance Module information in accordance with the embodiment of the present invention shown in FIG. 2.

FIG. 8 is a flow chart of an exemplary method 800 for providing the Finance Module 218 of the system of FIG. 2. Using this exemplary method 800, customers may dispute CDR rates online through a user interface. The customer (i.e. user) may select a number for a rate dispute 802 and, if the corresponding CDR is found, the customer selects one or more calls to dispute 804. The customer enters the rate they think is correct, recalculates amounts and submits a dispute 806. After review, if the dispute is approved 808, the disputed amount may be applied to the customer's account 810. If the dispute is rejected 812, the customer may be notified 814. The customer may also be notified while the dispute is pending and when the dispute is approved.

Figure 9:
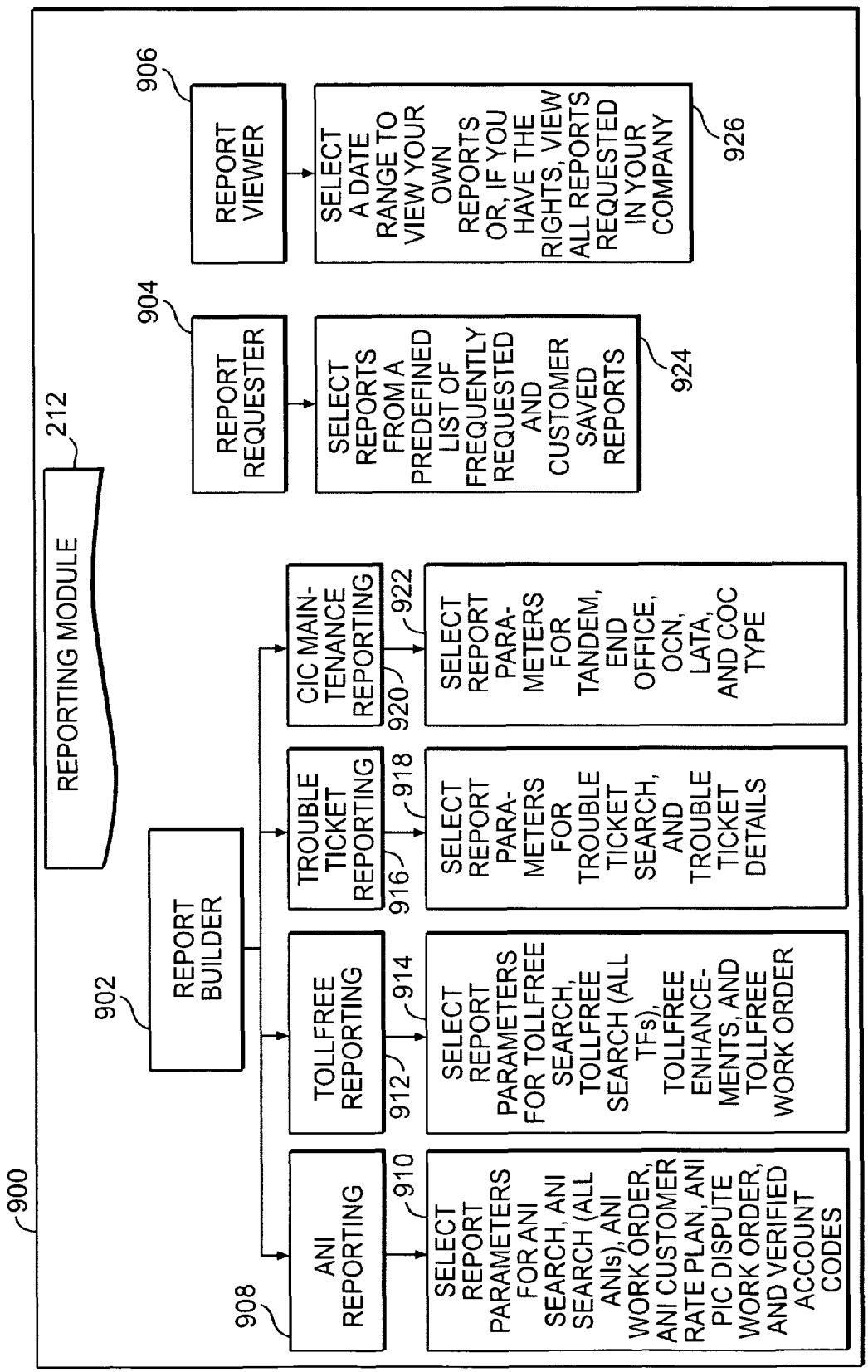
FIG. 9 is a flow chart of an exemplary method for providing Reporting Module information in accordance with the embodiment of the present invention shown in FIG. 2.

FIG. 9 is a flow chart of an exemplary method 900 for providing the Reporting Module 212 of the system of FIG. 2. This exemplary method 900 may utilize a report builder 902, a report requester 904, and a report viewer 906. For ANI reporting 908, the report builder 902 may provide the user with a selection of report parameters 910 for ANI search, ANI search for all ANIs, ANI work order, ANI customer rate plan, ANI PIC dispute work order, and verified account codes. For toll free reporting 912, the report builder 902 may provide the user with a selection of report parameters 914 for toll free search, toll free search for all TFs, toll free enhancements, and toll free work order. For trouble ticket reporting 916, the report builder 902 may provide the user with a selection of report parameters 918 for trouble ticket search, and trouble ticket details. For CIC maintenance reporting, the report builder 902 may provide the user with a selection of report parameters 922 for tandem, end office, OCN, LATA, and COC type. The report requester 904 may allow the user to select reports from a predefined list of frequently requested and customer saved reports 924. The report viewer 906 may allow the user to select a date range to view the user's reports or, if the user has the rights, to view all of the reports requested by the user's company 926. The user may store reports with specific parameters to be run again or at another time.

Figure 10A:
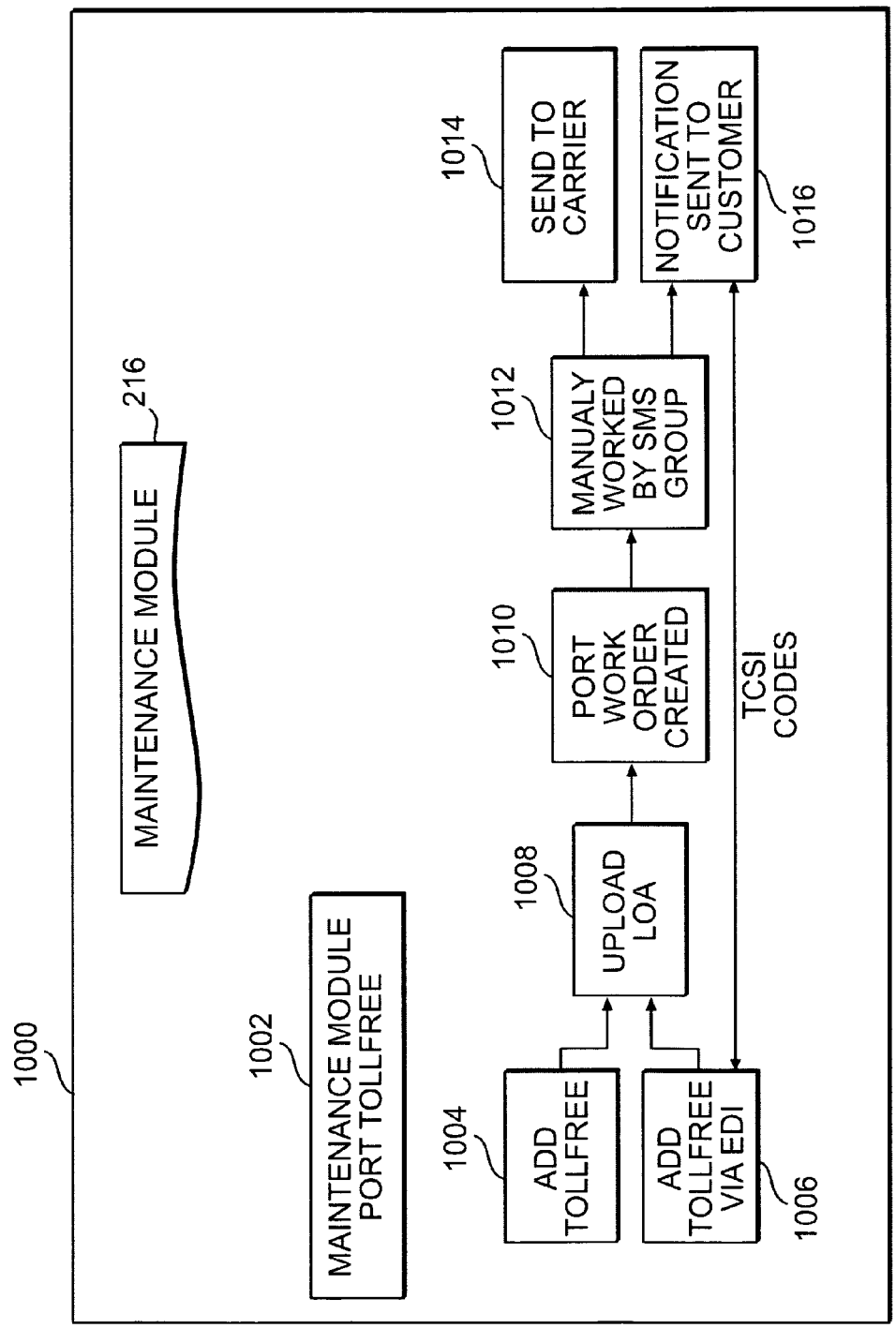
FIG. 10A is a flow chart of an exemplary method for providing Port Tollfree information for a Module in accordance with the embodiment of the present invention shown in FIG. 2.

FIG. 10A is a flow chart of an exemplary method 1000 for providing a Port Tollfree part 1002 of the Maintenance Module 216 of the system of FIG. 2. This exemplary method 1000 may be used to add a toll free number via a user interface 1004 or via the Electronic Data Interchange (EDI) 1006, upload a letter of agency (LOA) 1008, and/or create a port work order 1010. The SMS group may manually work the port order 1012, send the port order to a carrier 1014, and notify the customer 1016 and sends Transaction Code Status Indicators (TCSI) codes via EDI to the customer.

Figure 10B:
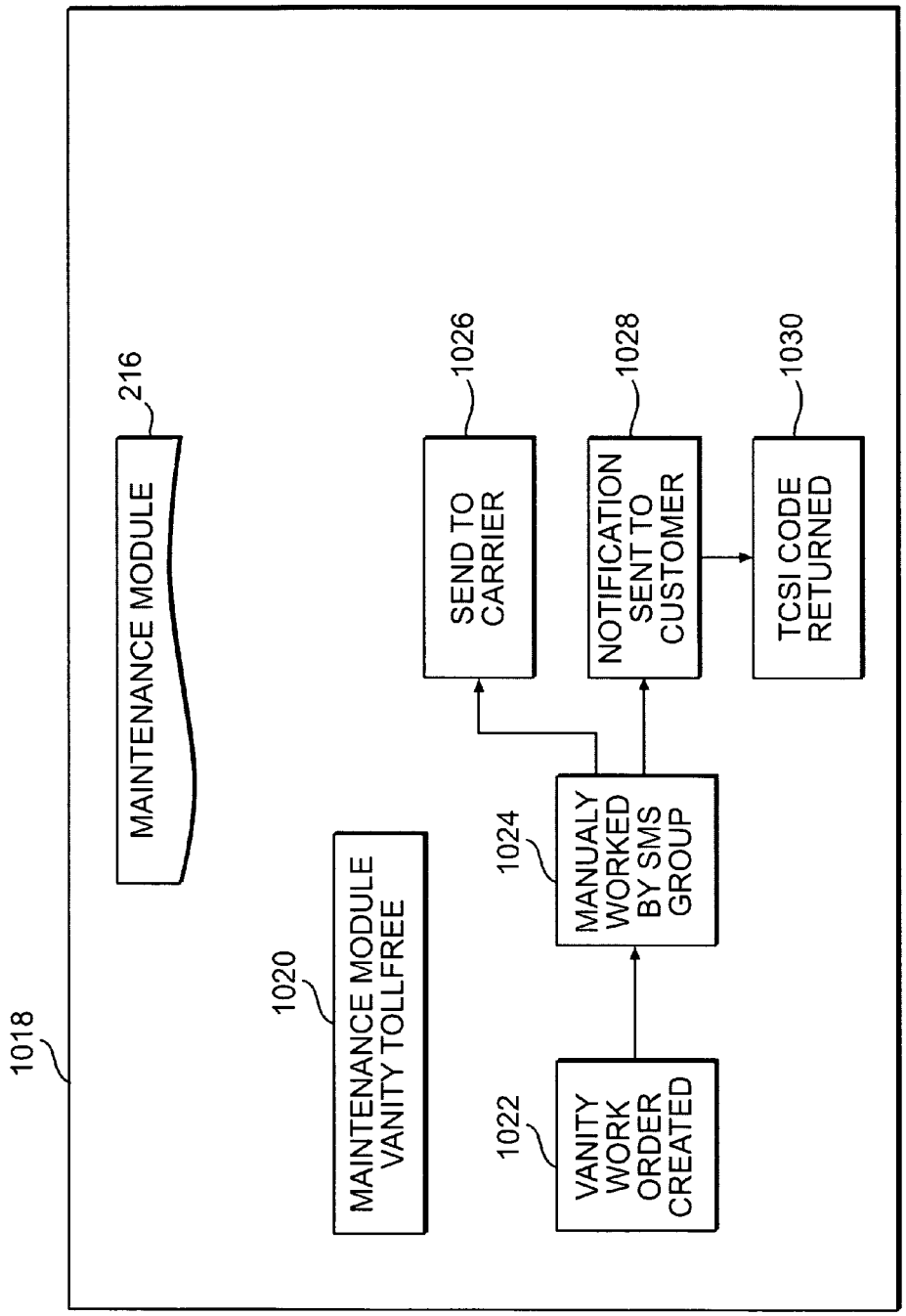
FIG. 10B is a flow chart of an exemplary method for providing Vanity Tollfree information for a Maintenance Module in accordance with the embodiment of the present invention shown in FIG. 2.

FIG. 10B is a flow chart of an exemplary method 1018 for providing a Vanity Tollfree part 1020 of the Maintenance Module 216 of the system of FIG. 2. This exemplary method 1018 may create vanity toll free numbers for customers by creating a vanity work order 1022 for the SMS group to work manually 1024 using the SMS database to determine whether the requested number is available. If the number is available, the SMS group may send the work order to a carrier 1026, send notification to the customer 1028 and sends TCSI codes via EDI to the customer 1030.

Figure 10C:
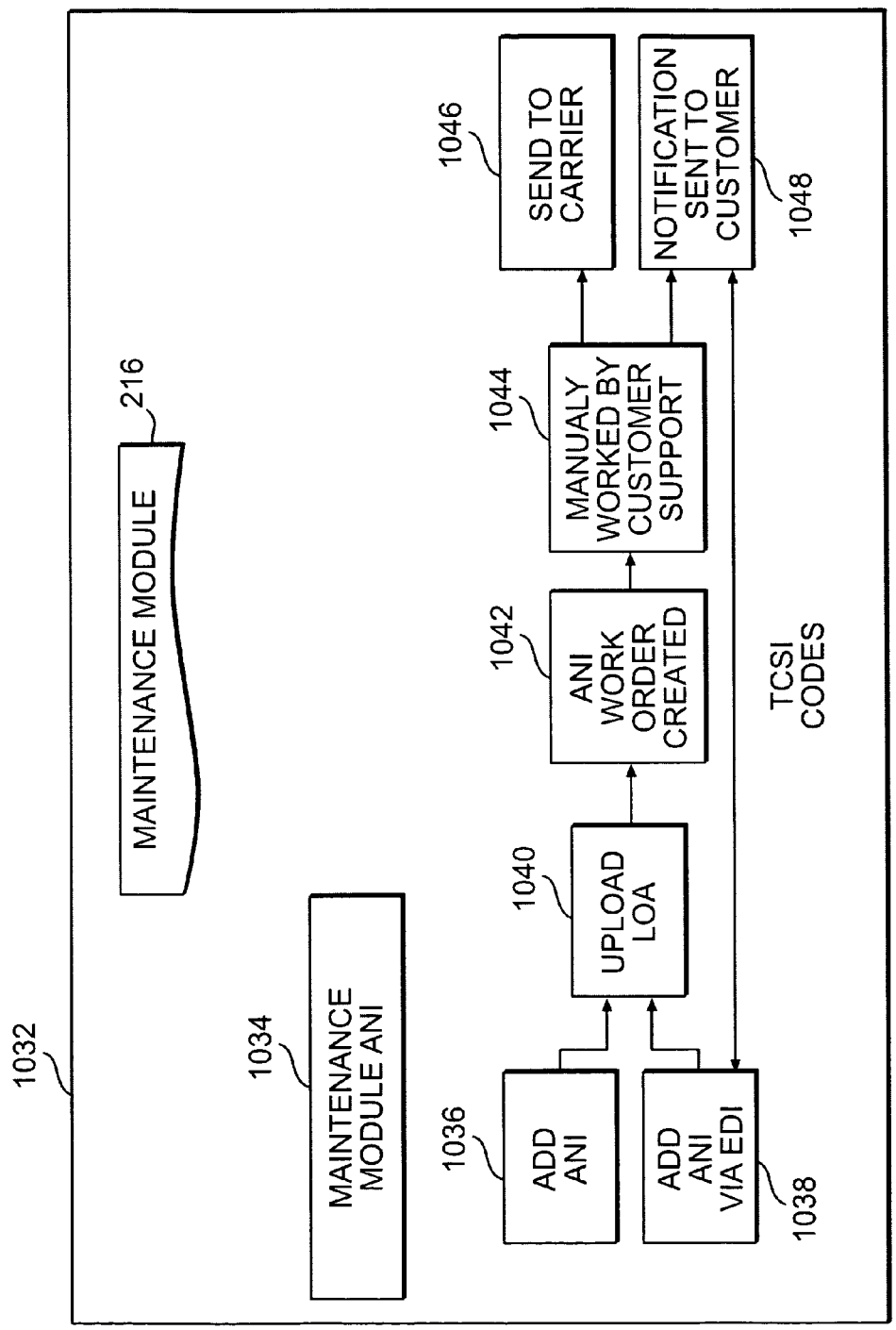
FIG. 10C is a flow chart of an exemplary method for providing Automatic Number Identification (ANI) information for a Maintenance Module in accordance with the embodiment of the present invention shown in FIG. 2.

FIG. 10C is a flow chart of an exemplary method 1032 for providing an Automatic Number Identification (ANI) part 1034 of the Maintenance Module 216 of the system of FIG. 2. This exemplary method 1032 may add an ANI 1036 via the network or via EDI 1038, upload the LOA 1040, and create an ANI work order 1042, which is worked manually by customer support 1044. The work order may be sent to a carrier 1046 and notification and TCSI codes may be sent to the customer 1048.

Figure 11:
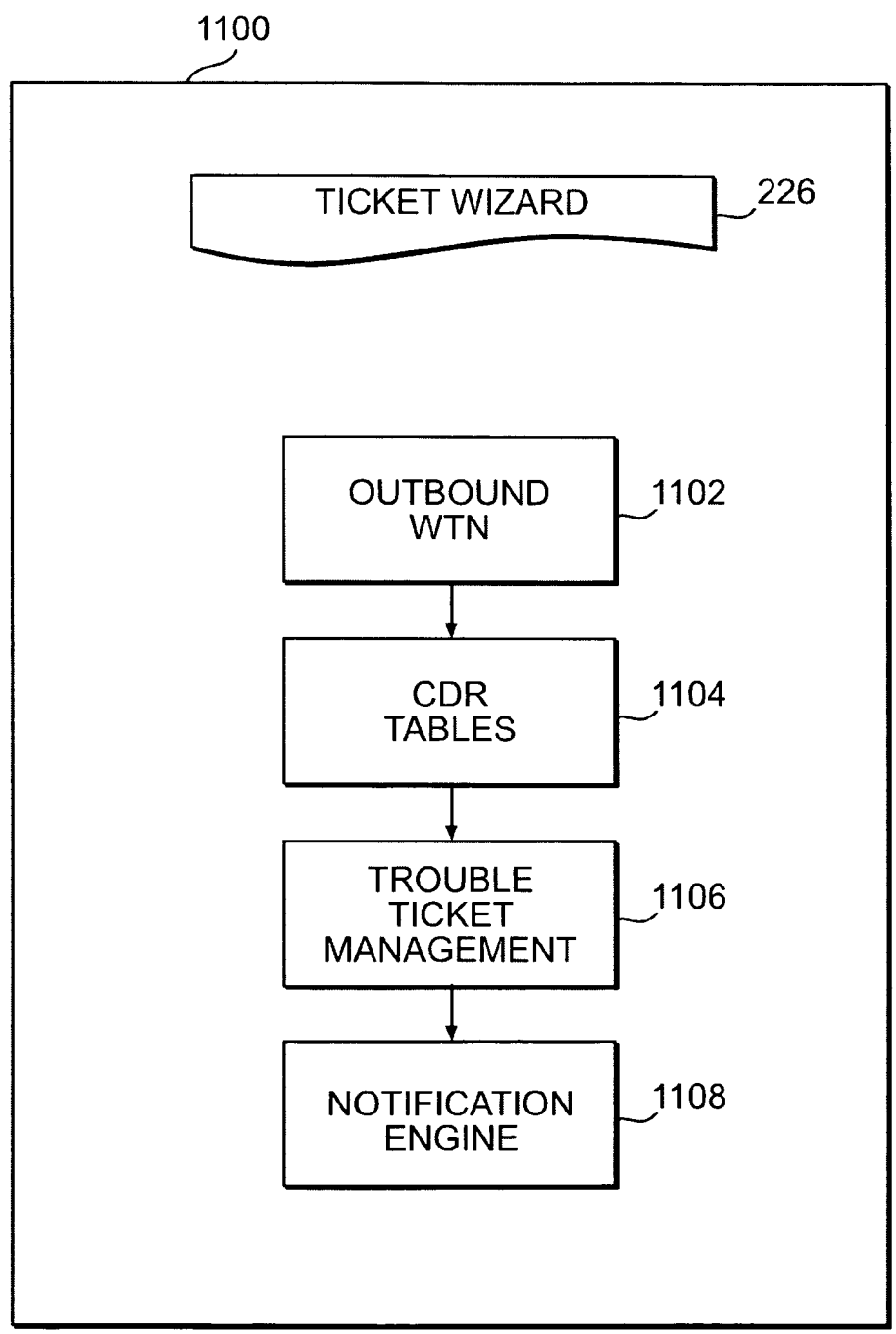
FIG. 11 is a flow chart of an exemplary method for providing the Trouble Ticket information for a Trouble Ticket Wizard in accordance with the embodiment of the present invention shown in FIG. 2.

FIG. 11 is a flow chart of an exemplary method 1100 for providing the Trouble Ticket Wizard 226 of the system of FIG. 2. This exemplary method 1100 may provide a user interface associated with the Maintenance Module 216 by querying Outbound WTN 1102 and CDR tables 1104, providing a user interface for trouble ticket management 1106, and providing notification 1108.

FIGS. 12 to 22C illustrate exemplary user interface screens for the exemplary system 200 of FIG. 2.

Figure 12:
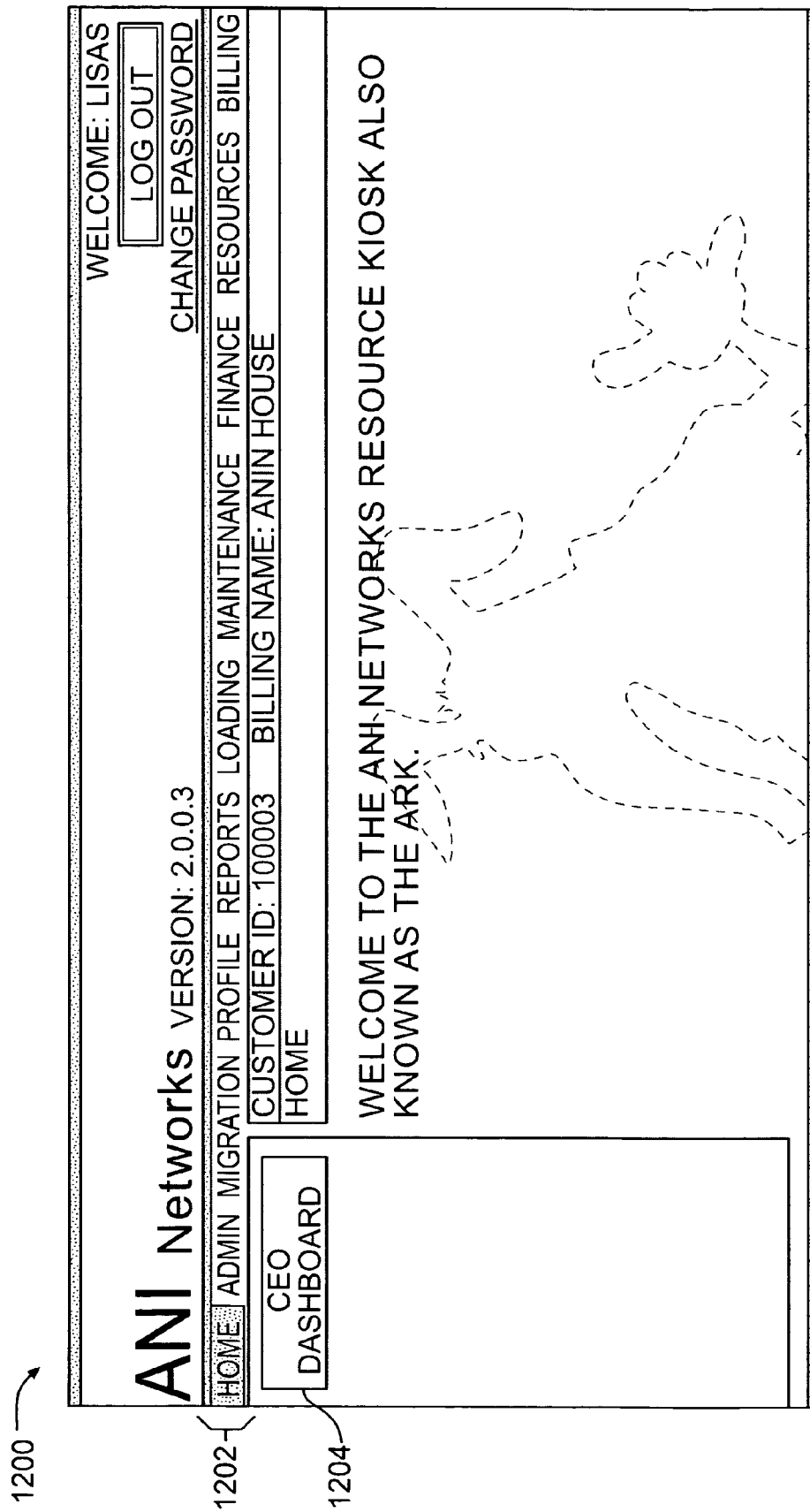
FIG. 12 is an exemplary Home screen shot of a user interface in accordance with the embodiment of the present invention shown in FIG. 2.

FIG. 12 is an exemplary Home screen shot of a user interface for the system of FIG. 2. The Home screen 1200 is where the user may be typically directed after logging in to the exemplary system 200. The Home screen 1200 may include a top menu selection 1202 of screens, such as Admin, Migration, Profile, Reports, Loading, Maintenance, Finance, Resources, and Billing. Each top menu choice represents a specialized section of the exemplary system 200. The Home screen 1200 may also include a side menu 1204. Side menu choices may differ depending on the top menu choice. Other embodiments may include different menu selections and various other user interface components. In FIG. 12, there is only one side menu 1204 choice, CEO Dashboard.

FIGS. 13A and 13B are an exemplary CEO Dashboard screen shot of a user interface for the system of FIG. 2. The CEO Dashboard screen 1300 may display various snapshot reports called gauges. These gauges may provide the user with a window into the user's accounts with the network service on, for example, a daily, weekly, and monthly basis. Some illustrative gauges are shown in FIG. 2. The Remaining Prepaid Balance gauge 1302 shows how much of the user's deposit payment, per account, has been used. The Remaining Postpaid Balance gauge 1304 shows how much of the user's guaranteed amount, per account, has been used. The Top 5 International Destinations by Duration (last 30 days) gauge 1306 shows, using duration (in minutes), which countries the user's customers have called the longest accumulated duration within the last 30 days. The Top 5 International Destinations by Call Count (last 30 days) gauge 1308 shows, using call count, which countries the user's customers have called the most often within the last 30 days. The Daily CDR Report gauge 1310 shows the number of calls, duration (in minutes) and the estimated billable amount (in dollars) on a daily basis. The Weekly CDR Trend Calls gauge 1312 shows the percentage change in the number of calls the user had on the stated day of the week as compared to the number of calls the user had on the same stated day of the prior week. The Weekly CDR Trend Duration gauge 1314 shows the percentage change in the total duration (in minutes) the user had on a particular day of the week as compared to the duration of calls the user had on the same weekday of the prior week. The 30 Day Summary Reports gauge 1316 shows by jurisdiction, the total number of active Working Telephone Numbers (WTNs) and Toll frees currently and 30 days in the past, the numbers that were added in the last 30 days, and how many were lost in the last 30 days.

Other embodiments of the CEO Dashboard 204 may include various other gauges, such as the Top 5 Domestic Destinations by Duration (last 30 days) gauge (not shown) which may show, using duration (in minutes), which states the user's customers have called the most often within the last 30 days. The Top 5 Domestic Destinations by Call Count (last 30 days) gauge (not shown) may be used to show, using call count, which states the user's customers have called the most often within the last 30 days. The ANI Summary Report (last 30 days) gauge (not shown) may be used to show, by jurisdiction, the total active ANIs as of midnight, how many were added, and how many were lost in the last 30 days, as well as how many ANIs were active on the user's account 30 days ago. The Tollfree Summary Report (last 30 days) gauge (not shown) may be used to show, by jurisdiction, the total active Toll frees as of midnight, how many were added, and how many were lost in the last 30 days as well as how many Toll frees were active on the user's account 30 days ago. The Unresolved Rejects Summary Report gauge (not shown) may be used to show how many ANIs and Toll frees have a reject code that has yet to be resolved. This gauge may also break these rejects out by the amount of time elapsed since the reject was received and no subsequent action has been taken. The Daily CDR Report (8-14 Days) gauge (not shown) may be used to show the number of calls, for what total duration (in minutes), and the estimated billable amount (in dollars) on a daily basis for the time period going back 8-14 days. The Daily CDR Report (15-30 Days) gauge (not shown) may be used to show the number of calls, duration (in minutes), and the estimated billable amount (in dollars) on a daily basis for the time period going back 15-30 days ago. The 30 Day Lost ANI Report gauge (not shown) may be used to show the number of ANIs the user has lost, based on Local Exchange Carrier Transaction Codes and Status Indicators (LEC TCSI).

When the user accesses the CEO Dashboard 204, the exemplary system 200 may use CDRs, provisioning files, and other information to provide current management reports. Some reports may be updated periodically (e.g., daily) or updated upon access to the CEO Dashboard 204 screen. The CEO Dashboard 204 may be used by a CEO, director or manager to view various gauges.

Figure 14B:
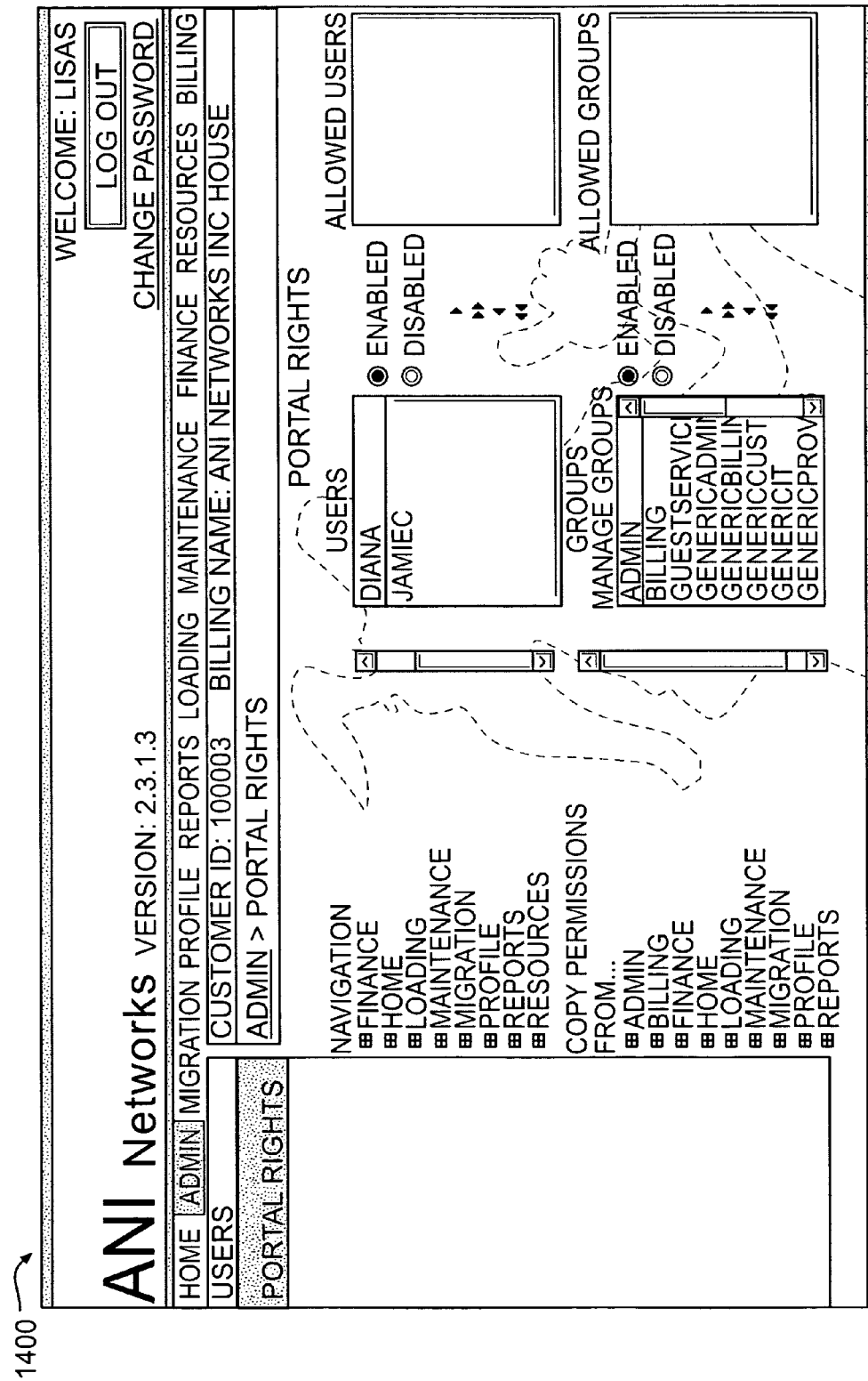
FIG. 14B is an exemplary Admin Module screen shot of a user interface displaying Portal Rights information in accordance with the embodiment of the present invention shown in FIG. 2.

FIG. 14A is an exemplary Admin Module screen shot of a user interface displaying Users information for FIG. 2. FIG. 14B is an exemplary Admin Module screen shot of a user interface displaying Portal Rights information for FIG. 2. The Admin screen 1400 may be accessed online to allow users to be added, modified, or removed and portal rights may be assigned for users and groups of users.

Figure 15A:
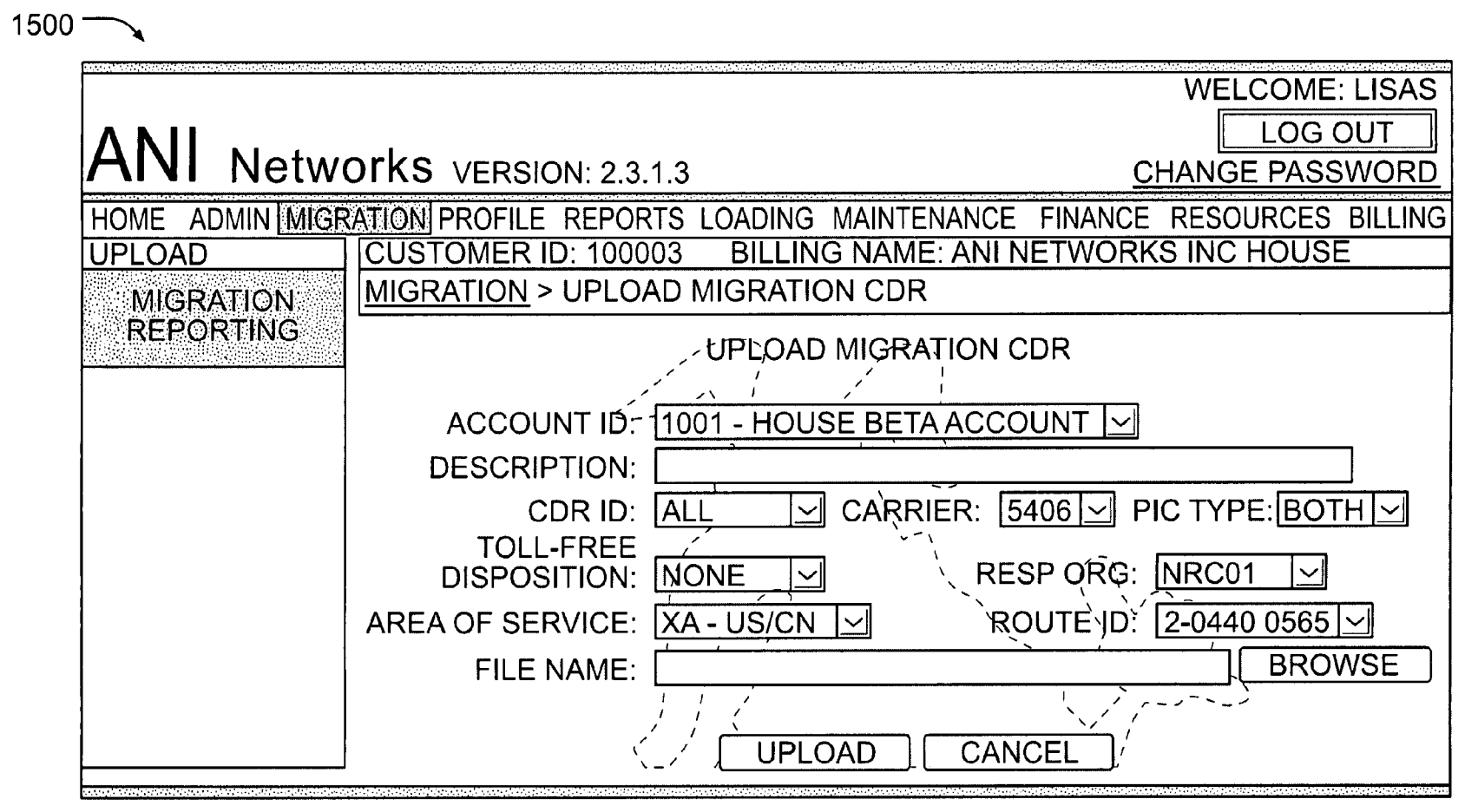
Figure 15B:
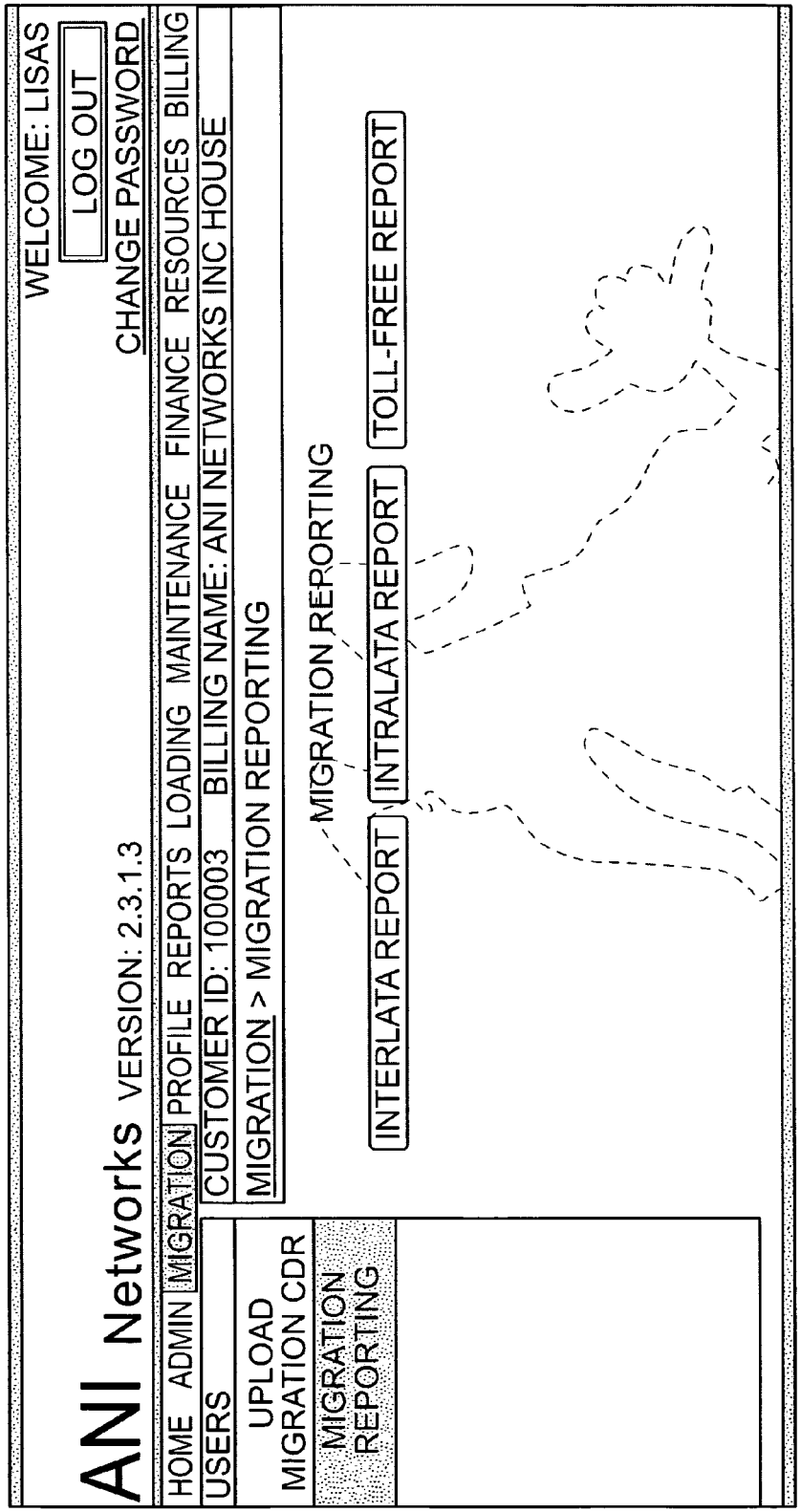
FIG. 15B is an exemplary Migration Module screen shot of a user interface displaying Migration Reporting information in accordance with the embodiment of the present invention shown in FIG. 2.

FIG. 15A is an exemplary Migration Module screen shot of a user interface displaying Upload Migration CDR information for the system of FIG. 2. FIG. 15B is an exemplary Migration Module screen shot of a user interface displaying Migration Reporting information for the system of FIG. 2. The Migration screen 1500 may be accessed online when the ANIs are already on a CIC that is part of the network. A PIC request is typically not sent to the LEC for these orders. Tollfree number migration also may be available. Various migration reports may be displayed.

Figure 16A:
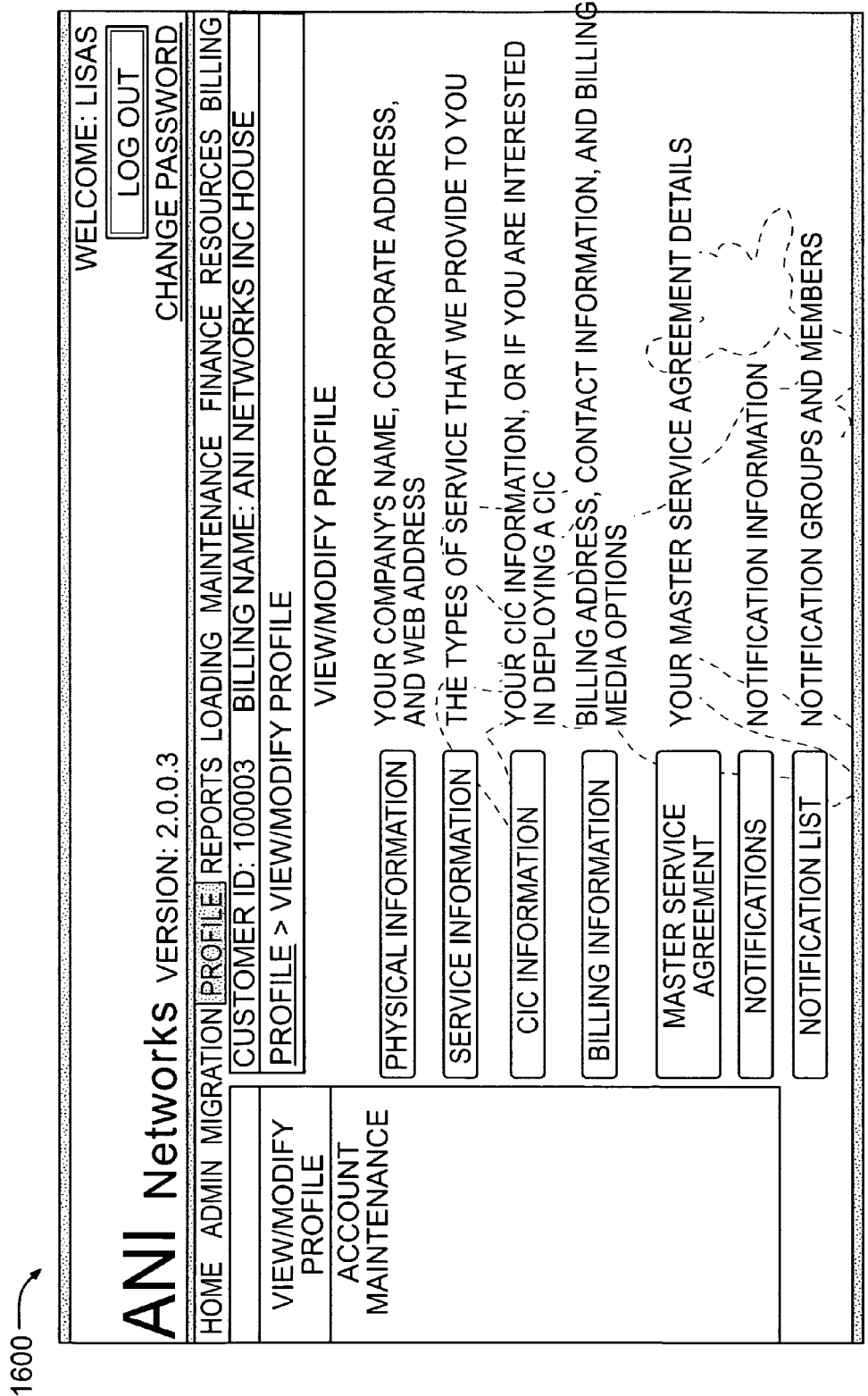
FIG. 16A is an exemplary Profile Module screen shot of a user interface displaying View/Modify information in accordance with the embodiment of the present invention shown in FIG. 2.
Figure 16B:
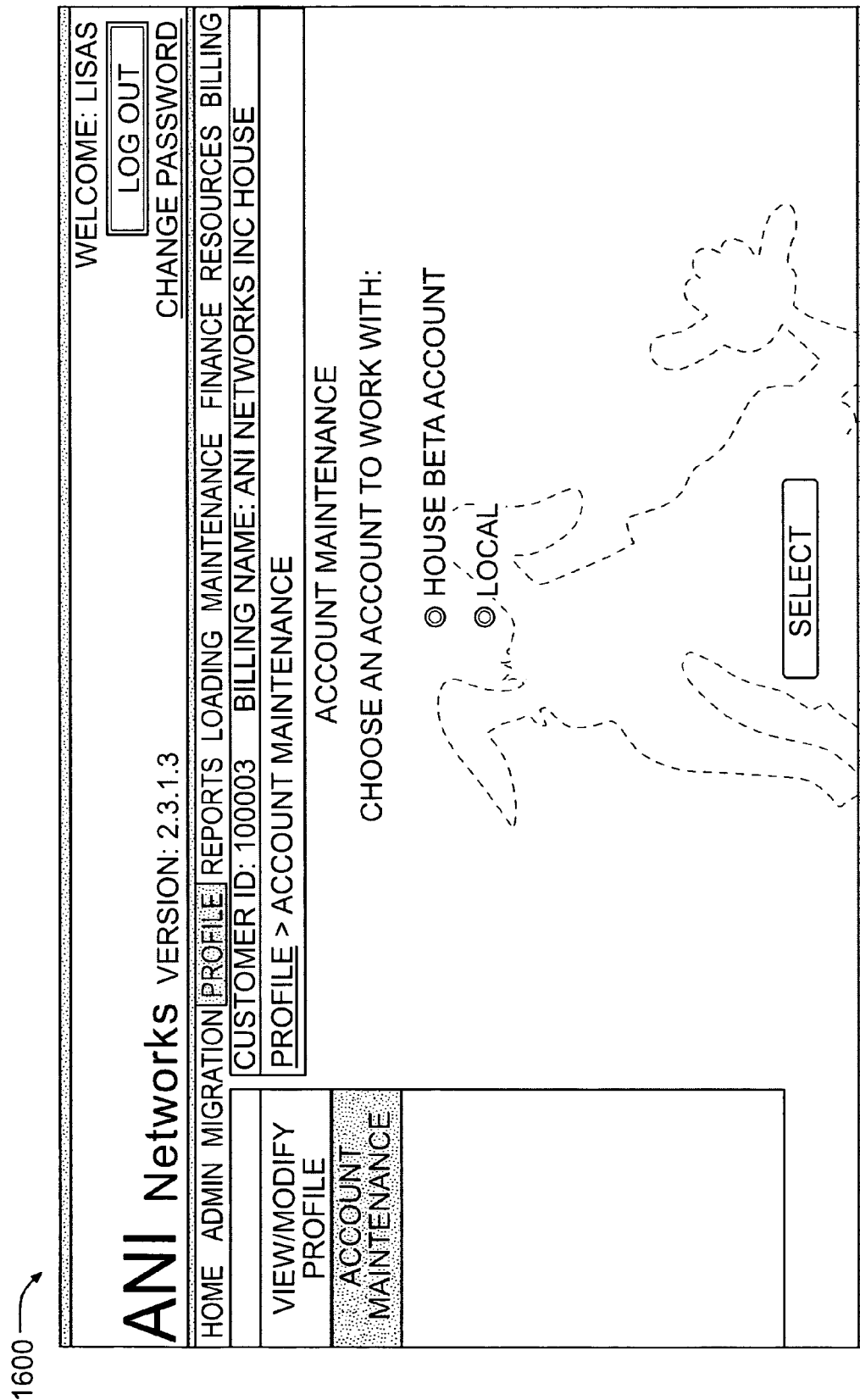
FIG. 16B is an exemplary Profile Module screen shot of a user interface displaying Account Maintenance information in accordance with the embodiment of the present invention shown in FIG. 2.

FIG. 16A is an exemplary Profile Module screen shot of a user interface displaying View/Modify Profile information for the system of FIG. 2. The Profile screen 1600 may be accessed online to create a profile for the user's company. The user profile may be used to identify for the exemplary system 200: the date of the month each user prefers to receive billing, the contact person for specific issues, what the company's future plans, how to help the company achieve its business goals, and the like. The user profile may include, for example, physical information (e.g., company name and contact information), service information, CIC information, billing information, Master Service Agreement and addendums, notification information, and account maintenance information. FIG. 16B is an exemplary Profile Module screen shot of a user interface displaying Account Maintenance information for the system of FIG. 2.

FIG. 16C is an exemplary Profile Module screen shot of a user interface displaying Network Assigned Provisioning (NAP) information for the system of FIG. 2. The exemplary system 200 may be of FIG. 2 may provide network optimization functionality to assure that ANIs (i.e., WTNs and Toll frees) are loaded to the most effective switch and trunk. The exemplary system 200 may eliminate duplicate loading when it is not necessary, and may take into account the originating trunk or switch that an NPA/NXX is assigned to in provisioning. There may be one screen for Tollfree and another screen for WTNs.

Figure 16F:
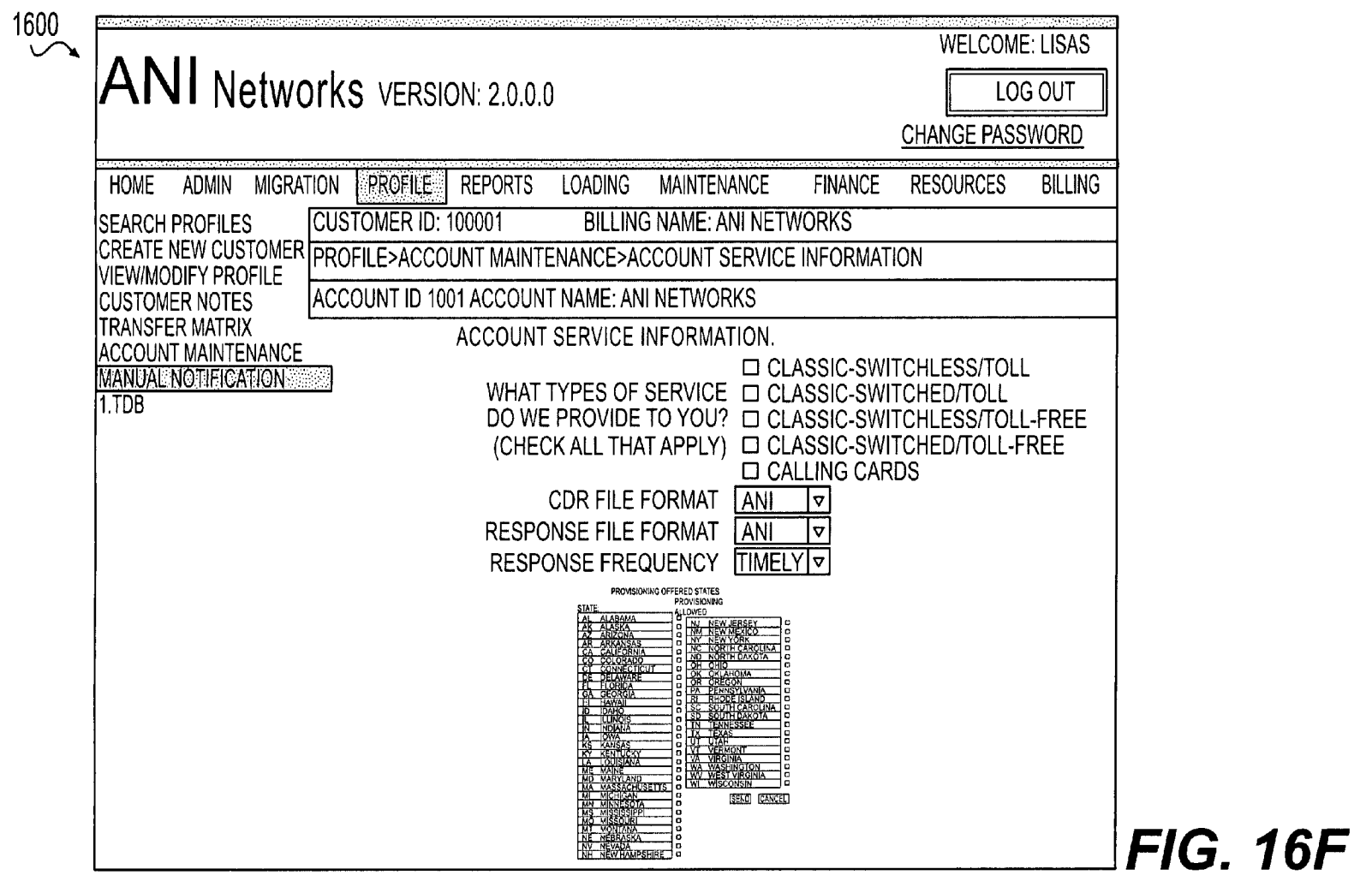

FIG. 16D is an exemplary Profile Module screen shot of a user interface displaying ANI Carrier Description (ACD) information for the NAP for the system of FIG. 2. The ANI ACD for the NAP screen may allow the user to define the carrier designation assigned to the NAP. There may be one screen for Tollfree and another screen for WTNs. FIG. 16E is an exemplary screen shot of a user interface displaying Provisioning Allowed States (SAP) information for the system of FIG. 2. FIG. 16F is an exemplary Profile Module screen shot of a user interface displaying Sample Placement of Provisioning Offered States (POS) information for the system of FIG. 2.

Figure 17A:
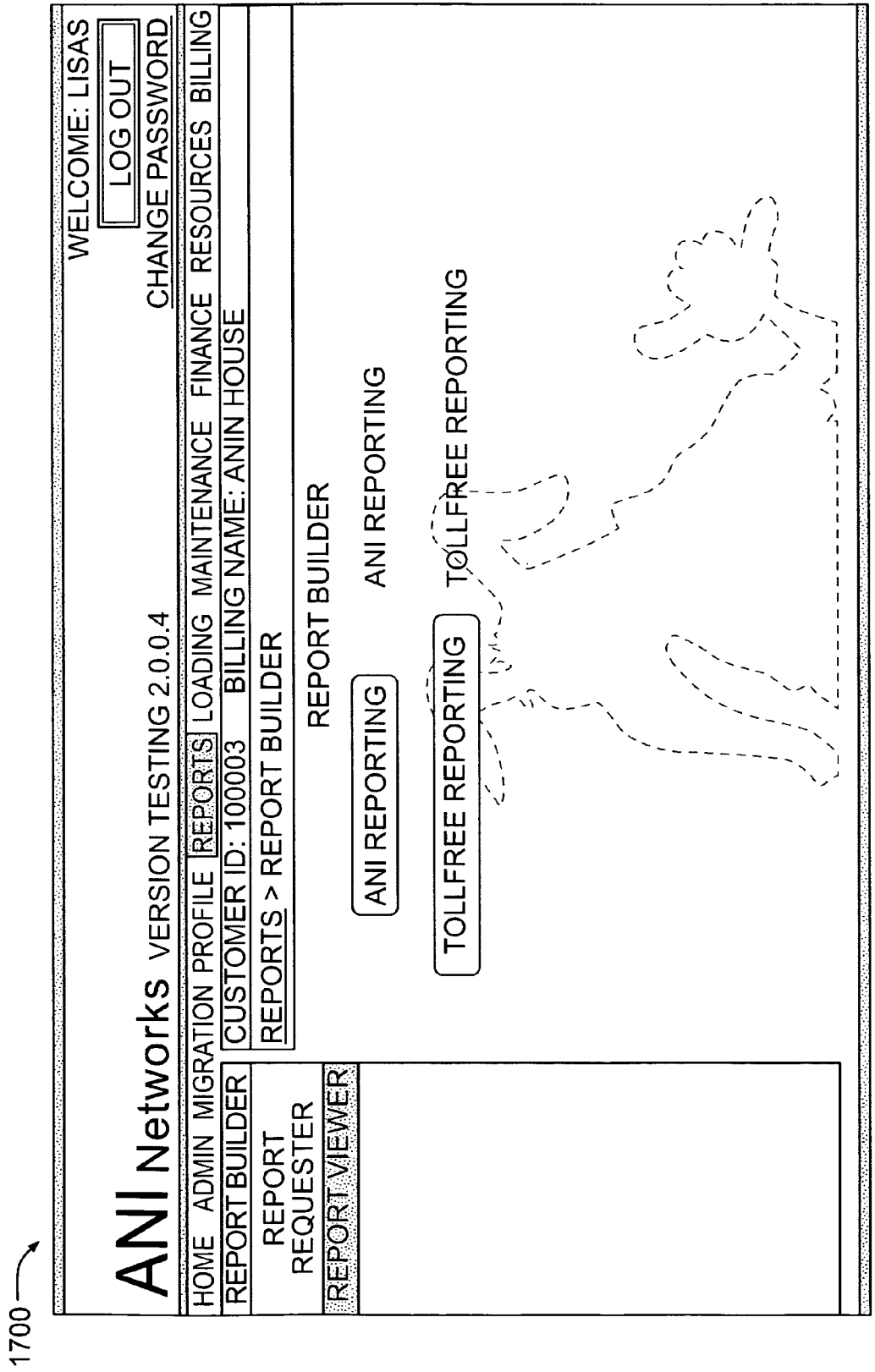
FIG. 17A is an exemplary Reporting Module screen shot of a user interface displaying Report Builder information in accordance with the embodiment of the present invention shown in FIG. 2.

FIG. 17A is an exemplary Reporting Module screen shot of a user interface displaying Report Builder information for the system of FIG. 2. The Reporting screen 1700 may allow the user create pre-defined reports, create and save custom reports, and view and save report results. FIG. 17B is an exemplary Reporting Module screen shot of a user interface displaying Report Requester information for the system of FIG. 2. FIG. 17C is an exemplary Reporting Module screen shot of a user interface displaying Report Viewer information for the system of FIG. 2.

Figure 18A:
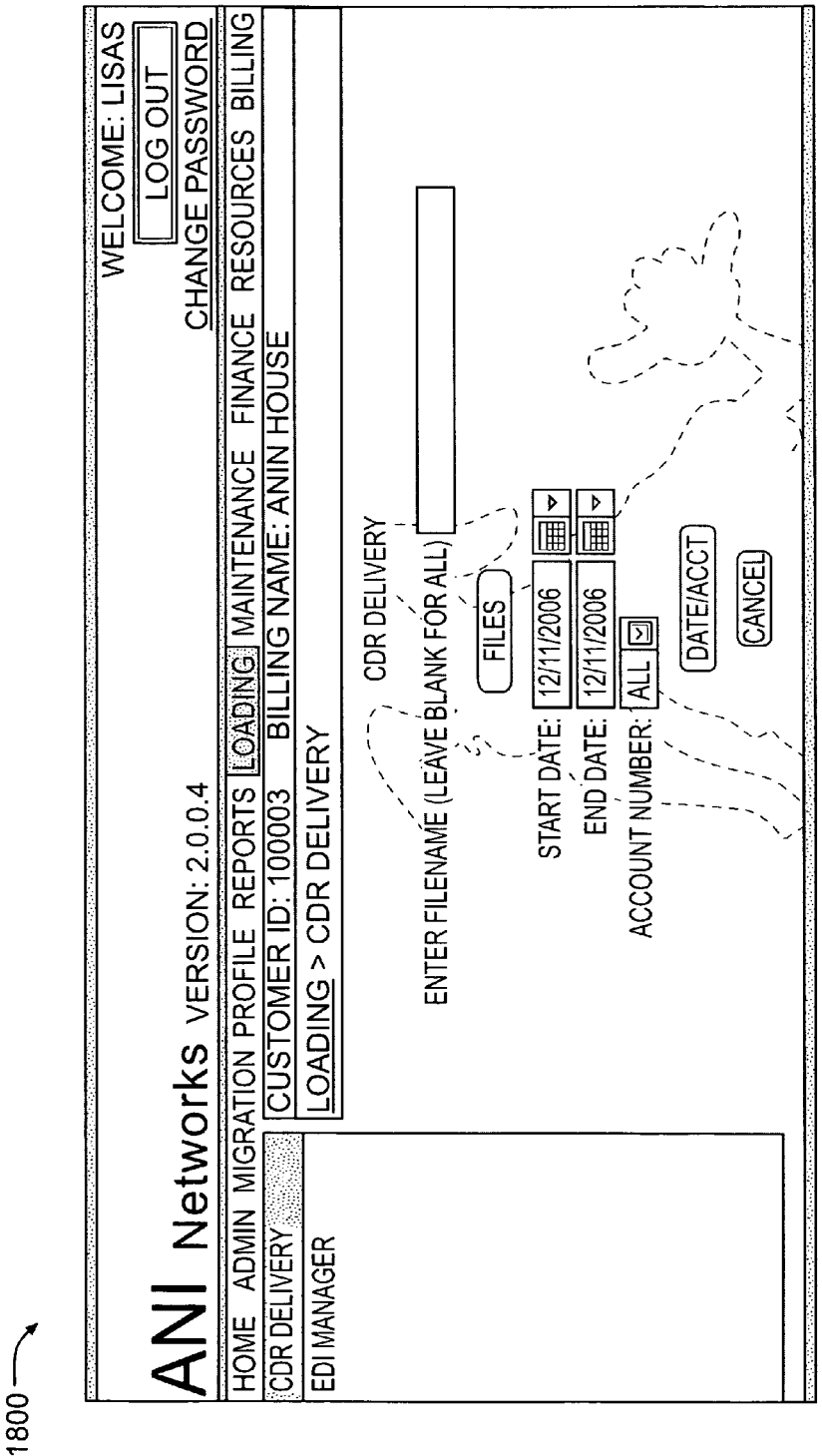
FIG. 18A is an exemplary Loading Module screen shot of a user interface displaying CDR Delivery information in accordance with the embodiment of the present invention shown in FIG. 2.
Figure 18B:
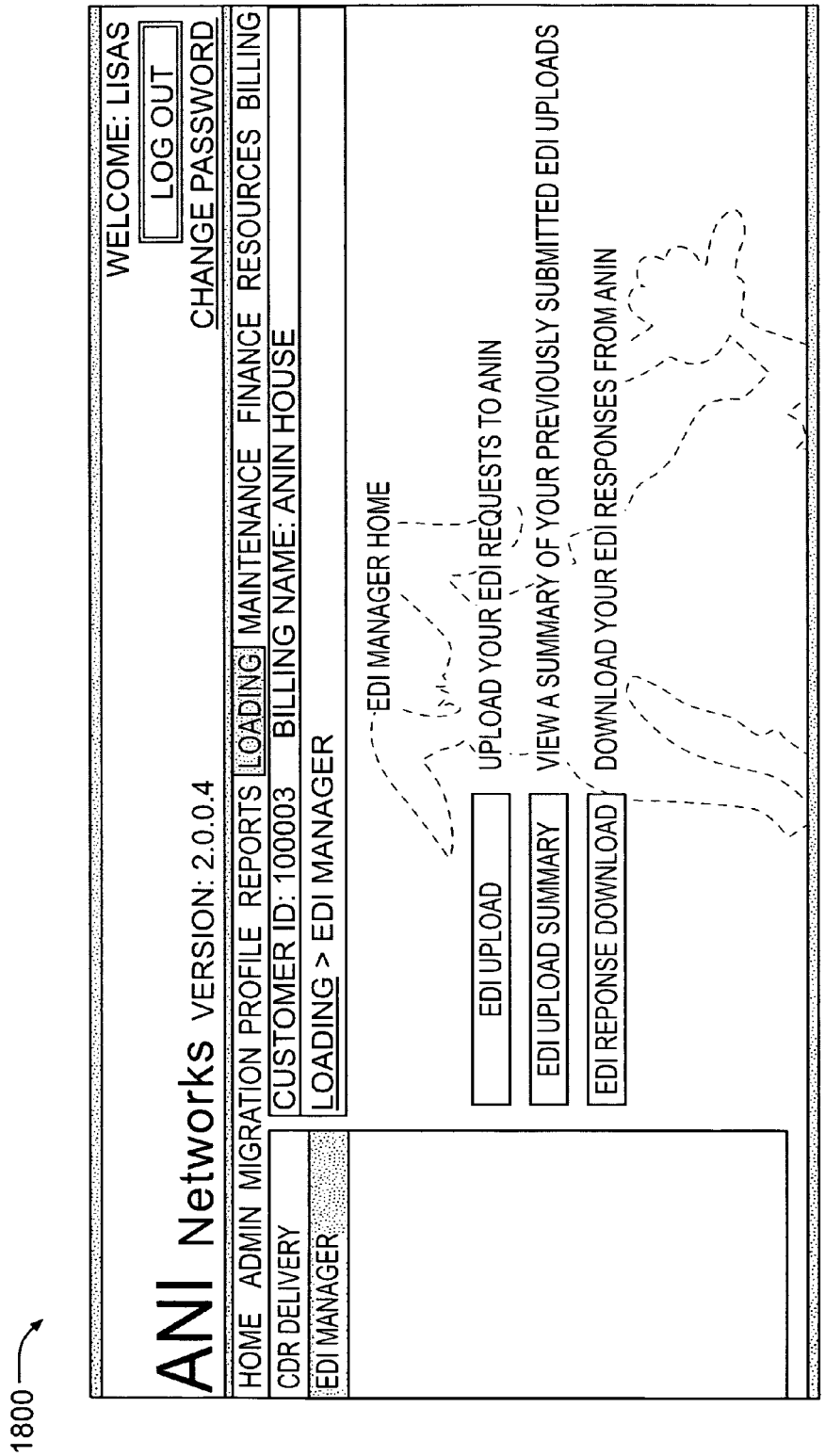
FIG. 18B is an exemplary Loading Module screen shot of a user interface displaying EDI Manager Home information in accordance with the embodiment of the present invention shown in FIG. 2.

FIG. 18A is an exemplary Loading Module screen shot of a user interface displaying CDR Delivery information for the system of FIG. 2. The Loading screen 1800 may load, deliver, and store CDR files. A CDR delivery schedule may be defined in the user profile. FIG. 18B is an exemplary Loading Module screen shot of a user interface displaying EDI Manager information for the system of FIG. 2. The EDI Manager may be used to upload order files and download response files.

Figure 19A:
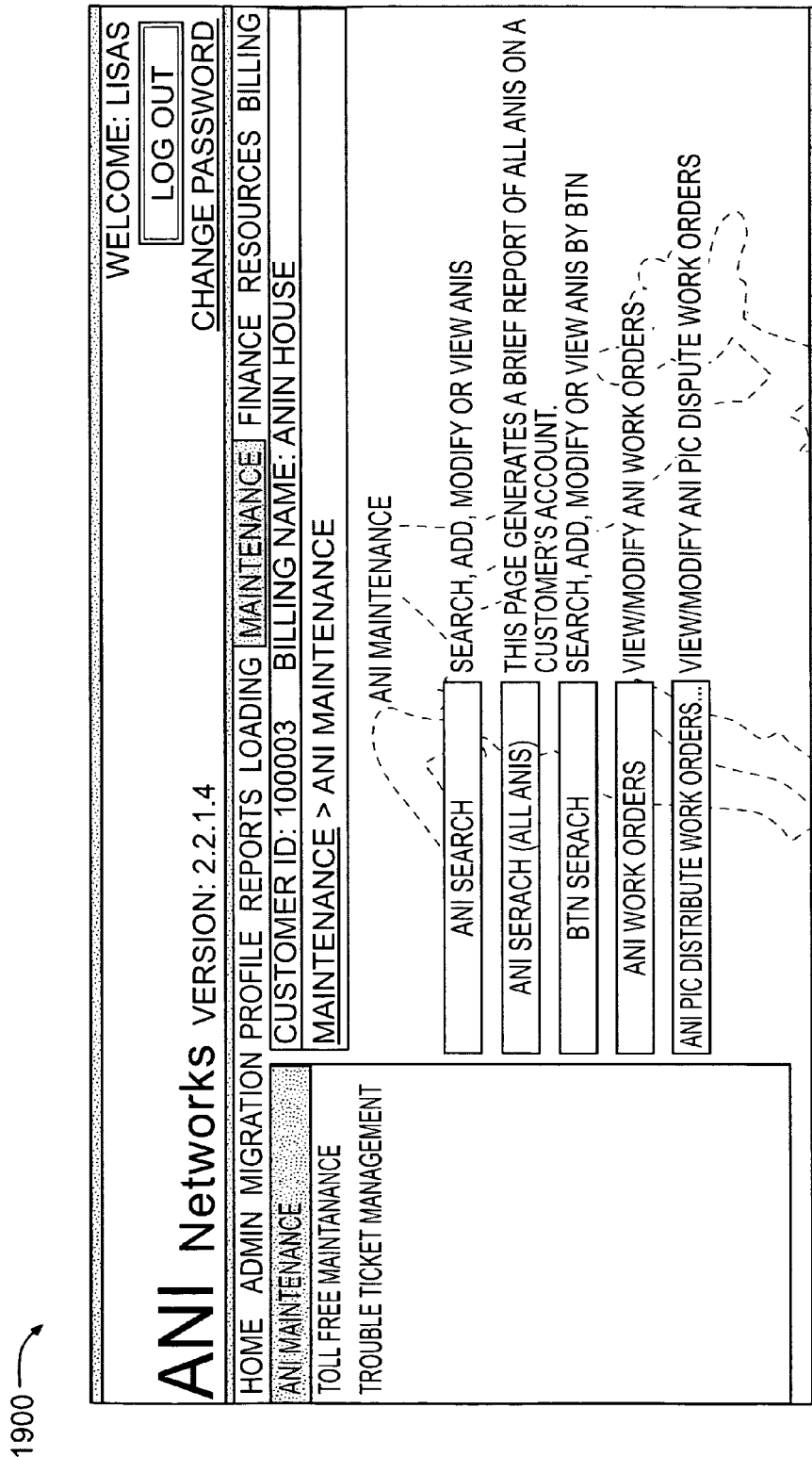
FIG. 19A is an exemplary Maintenance Module screen shot of a user interface displaying ANI Maintenance information in accordance with the embodiment of the present invention shown in FIG. 2.
Figure 19B:
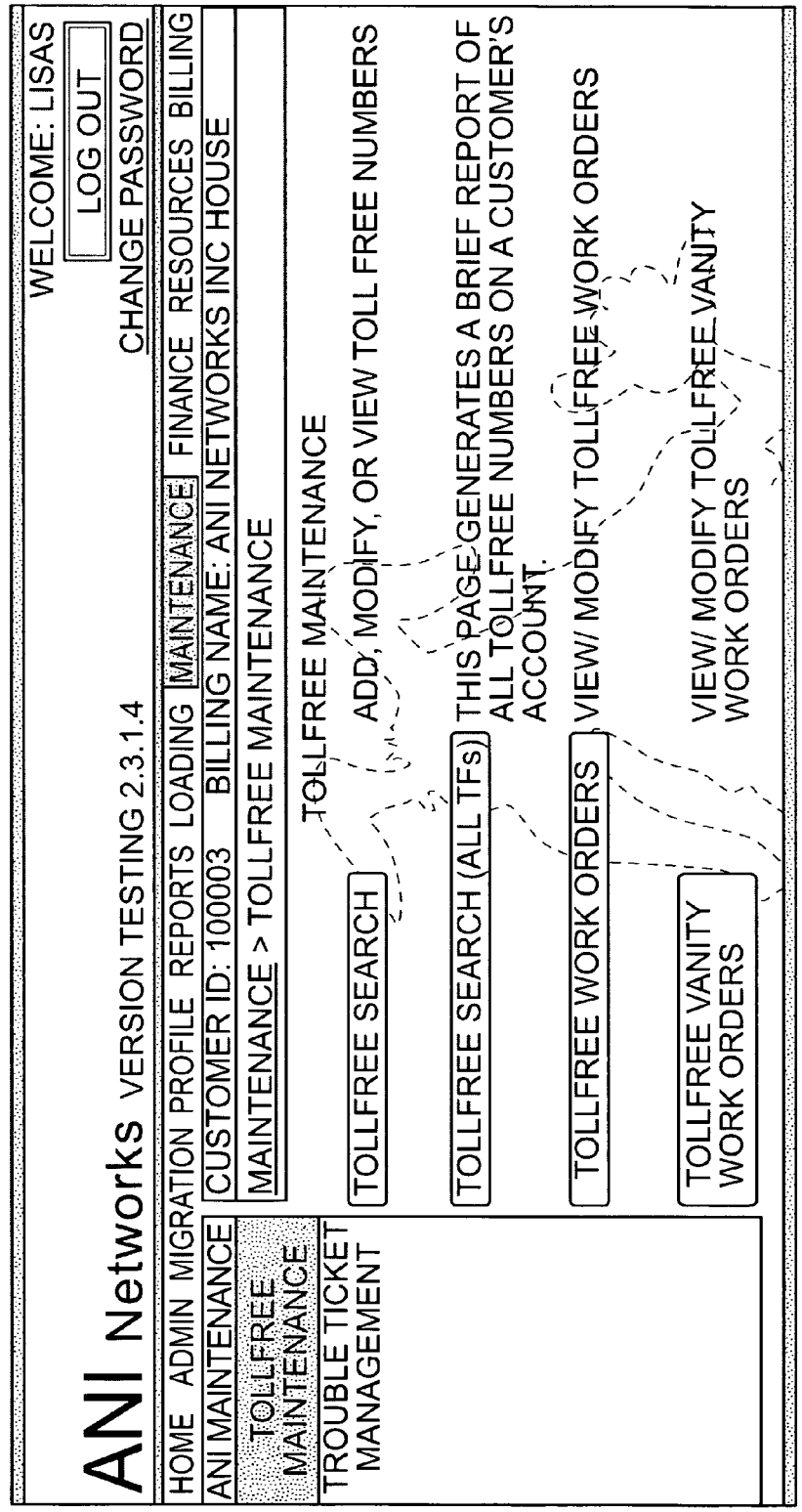
FIG. 19B is an exemplary Maintenance Module screen shot of a user interface for Tollfree Maintenance information displaying in accordance with the embodiment of the present invention shown in FIG. 2.

FIGS. 19A-C are exemplary Maintenance Module screenshots of a user interface of the system of FIG. 2. FIG. 19A is an exemplary Maintenance Module screen shot of a user interface displaying ANI Maintenance; FIG. 19B is an exemplary Maintenance Module screen shot of a user interface displaying Tollfree Maintenance information; and FIG. 19C is an exemplary Maintenance Module screen shot of a user interface displaying Trouble Ticket Maintenance. The Maintenance screen 1900 may allow the user to maintain ANIs and Tollfree numbers, provide tools to maintain verified account codes, as well as enhancements to Tollfree numbers, and provide Trouble Ticket Management. The user may manage ANIs, manage any verified or non-verified codes associated with ANIs, and handle any Trouble Tickets on the ANIs and ANI work orders.

Figure 20C:
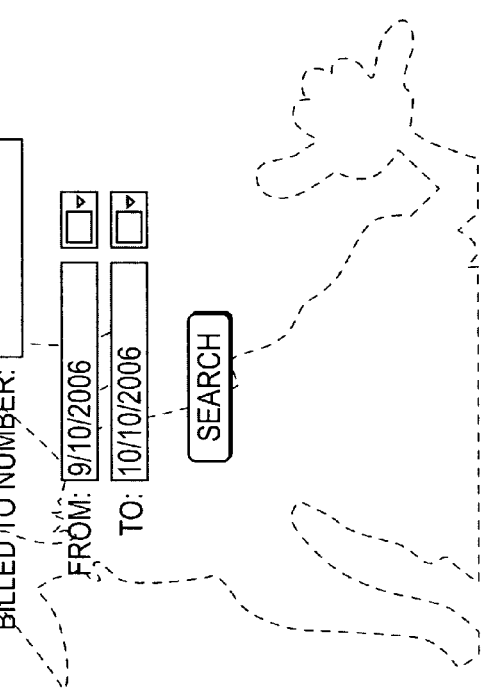
FIG. 20C is an exemplary Finance Module screen shot of a user interface displaying CDR Rate Disputes information in accordance with the embodiment of the present invention shown in FIG. 2.
Figure 20E:
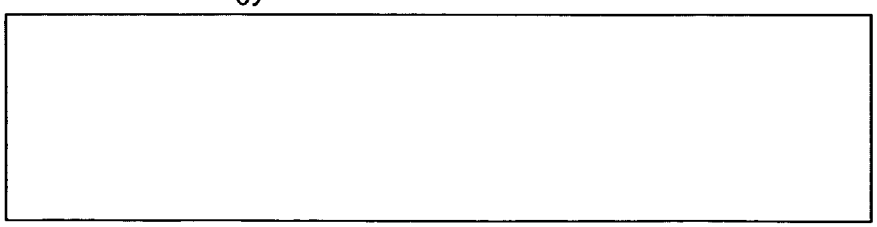

FIGS. 20A-E are exemplary Finance Module screen shots of a user interface of the system of FIG. 2. FIG. 20A is an exemplary Finance Module screen shot of a user interface displaying View Transactions information; FIG. 20B is an exemplary Finance Module screen shot of a user interface displaying View All Charges information; FIG. 20C is an exemplary Finance Module screen shot of a user interface displaying CDR Rate Disputes information; and FIGS. 20D and 20E are an exemplary Finance Module screen shot of a user interface displaying Carrier Dispute Request information.

FIG. 21 is an exemplary Resources Module screen shot of a user interface for a Forms Library for the system of FIG. 2. The Resources screen 2100 may provide access ti an online library of various forms, such as network service-related forms, industry forms, reference documentation, file layouts, user guide, and other documents. User documents may be stored in the forms library. Documents may be organized by category.

Figure 22A:
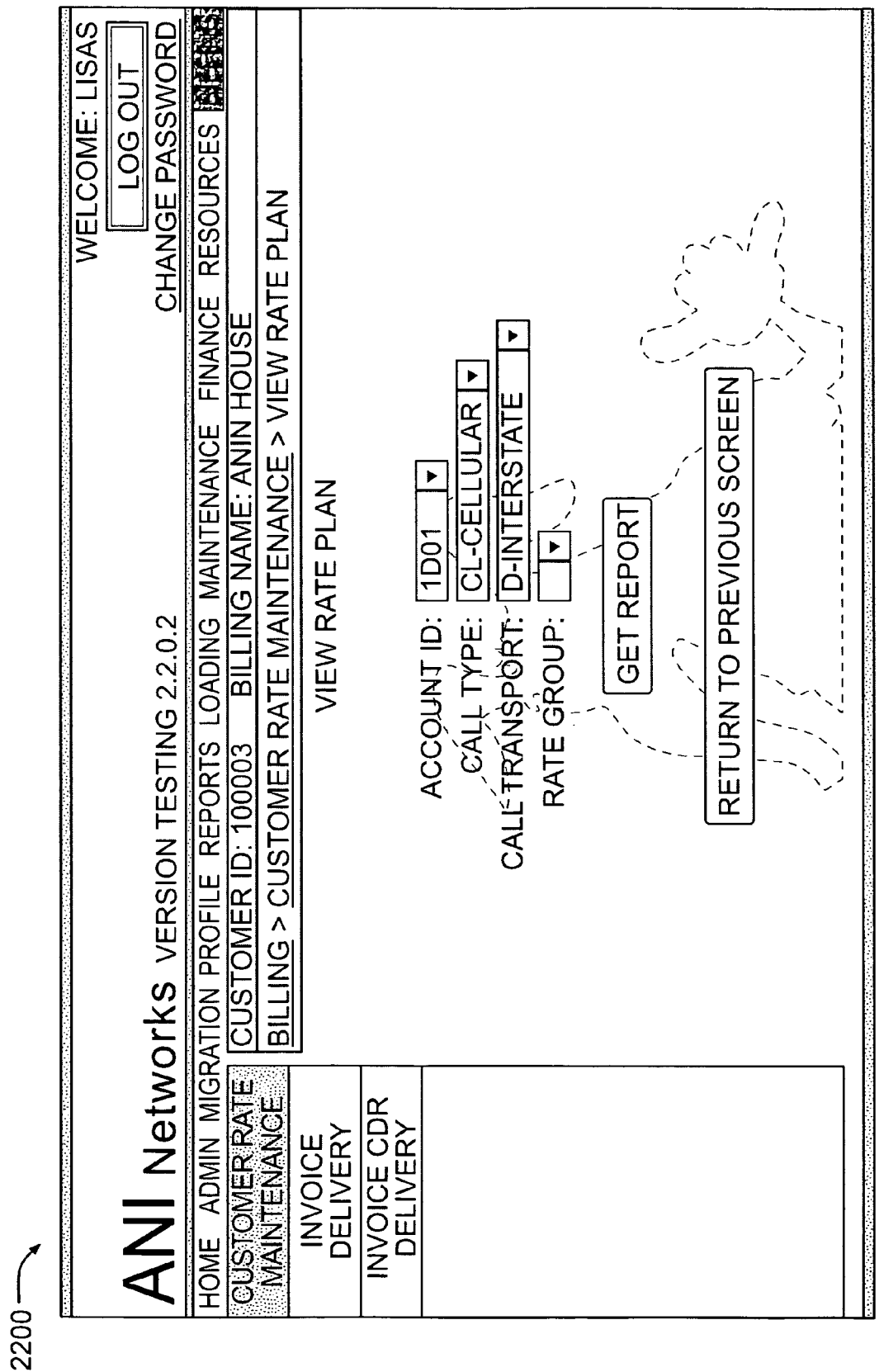
FIG. 22A is an exemplary Billing Module screen shot of a user interface displaying View Rate Plan information in accordance with the embodiment of the present invention shown in FIG. 2.
Figure 22B:
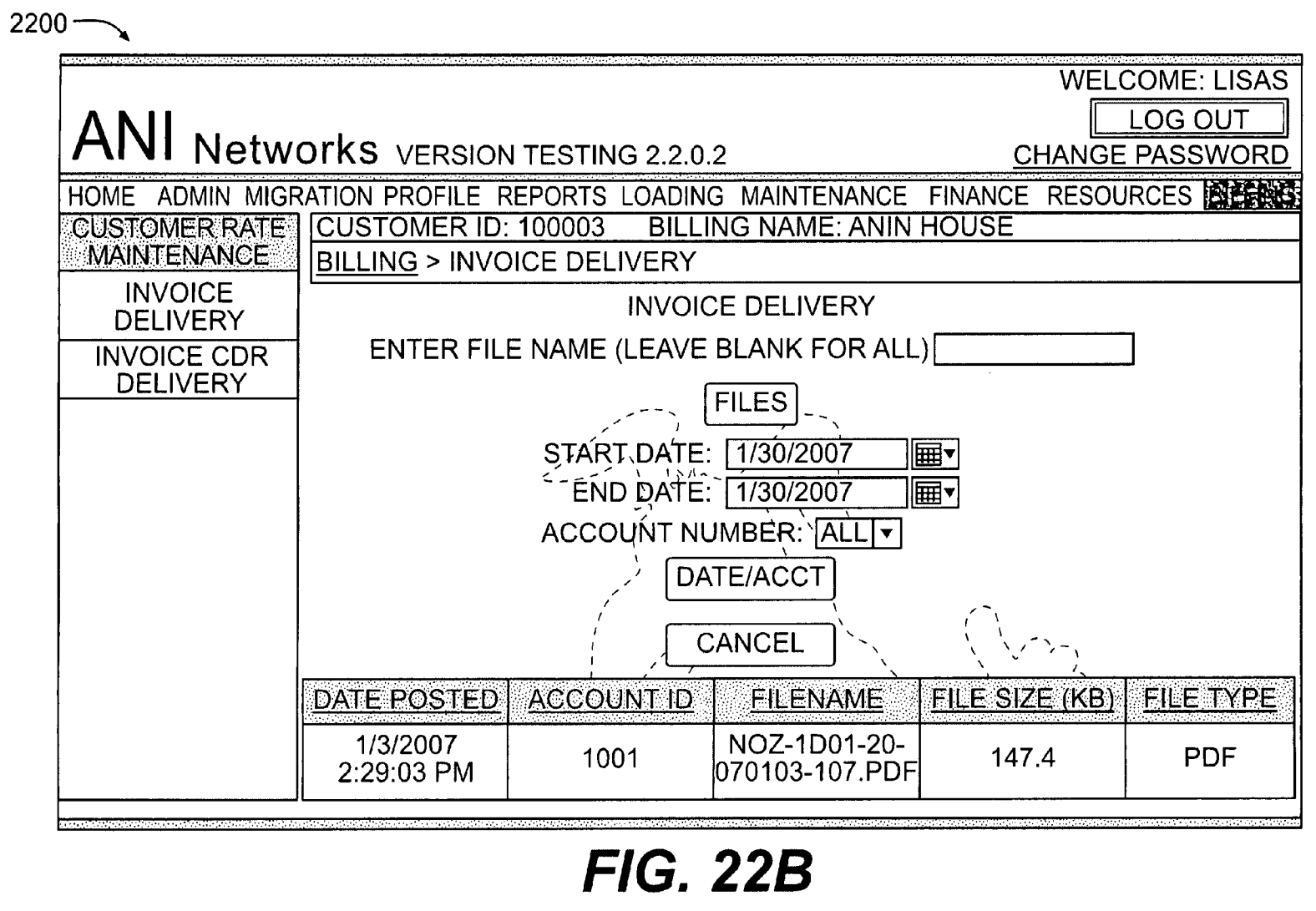

FIGS. 22A-C are exemplary Billing Module screen shots of a user interface for the system of FIG. 2. FIG. 22A is an exemplary Billing Module screen shot of a user interface displaying View Rate Plan information; FIG. 22B is an exemplary Billing Module screen shot of a user interface displaying Invoice Delivery information; and FIG. 22C is an exemplary Billing Module screen shot of a user interface displaying Invoice CDR Delivery information. The Billing screen 2200 may provide the user with online access to contract rates for each of the user's accounts, invoice delivery, and CDR delivery.

It will be apparent to those skilled in the art that variations and modifications of the present invention can be made without departing from the scope or spirit of the invention. Thus, it is intended that the present invention cover all such modifications and variations of the invention, provided they come within the scope of the appended claims and their equivalents.

What is claimed is:

1. A method for providing a display associated with a user of telephony services with visually perceptible information regarding a telecommunications network used to provide the telephony services, comprising:
   collecting, using a computer, a plurality of financial information, a plurality of provisioning information, a plurality of line loss information, a plurality of call event distribution information and a plurality of call trending information associated with the telephony services provided to the user,
   wherein the call event distribution information comprises an indication of a number of top destinations by call count, and wherein the call trending information comprises a percentage comparison of a first number of calls in a first time period compared with a second number of calls in a second time period;
   storing the plurality of financial information, the plurality of provisioning information, the plurality of line loss information, the plurality of call event distribution information and the plurality of call trending information in one or more databases associated with said computer; and
   providing visually perceptible display information to the display associated with the user which is representative of the stored plurality of financial information, plurality of provisioning information, plurality of line loss information, plurality of call event distribution information and plurality of call trending information.

2. The method of claim 1, further comprising:
   collecting maintenance information comprising toll free numbers, a plurality of work orders, and a plurality of Automatic Number Identifications (ANIs) associated with the telephony services provided to the user; and
   providing display information to the display associated with the user which is representative of the maintenance information.

3. The method of claim 1, further comprising:
   collecting migration information associated with the telephony services provided to the user comprising a plurality of Call Detail Report (CDR) data;
   storing the migration information in the one or more databases; and
   providing display information to the display associated with the user which is representative of the migration information.

4. The method of claim 1, further comprising:
   collecting profile information associated with the telephony services provided to the user comprising at least one service agreement;
   storing the profile information in the one or more databases; and
   providing display information to the display associated with the user which is representative of the profile information.

5. The method of claim 1, further comprising:
   collecting Preferred Primary Interexchange Carrier (PIC) information associated with the telephony services provided to the user comprising a Feature Group D footprint;
   storing the PIC information in the one or more databases; and
   providing display information to the display associated with the user which is representative of the PIC information.

6. The method of claim 1, further comprising:
   providing display information to the display associated with the user, said display information being for submitting and resolving rate disputes using the financial information;
   receiving at said computer, rate dispute information from the user;
   storing the rate dispute information using said computer;
   determining rate dispute resolution information based on the rate dispute information using said computer; and
   transmitting the rate dispute resolution information to the display associated with the user.

7. The method of claim 1, further comprising:
   collecting, using said computer, billing information associated with the telephony services provided to the user comprising contracted rate information; and
   providing the display associated with the user with display information adapted to assist the user in accessing the contracted rate information.

8. The method of claim 1, wherein the provisioning information comprises information about one or more unresolved rejects.

9. The method of claim 8, wherein the financial information comprises an indication of a remaining deposit balance.

10. A non-transitory computer-readable medium comprising instructions executed by a processor and for performing a method of providing a user of telephony services with information regarding the telephony services, the method comprising:

collecting a plurality of financial information, a plurality of provisioning information, a plurality of line loss information, a plurality of call event distribution information and a plurality of call trending information associated with the telephony services provided to the user, wherein the call event distribution information comprises an indication of a number of top destinations by call count, and wherein the call trending information comprises a percentage comparison of a first number of calls in a first time period compared with a second number of calls in a second time period;

storing the plurality of financial information, the plurality of provisioning information, the plurality of line toss information, the plurality of call event distribution information and the plurality of call trending information in one or more databases; and providing display information to the user which is representative of the stored plurality of financial information, the plurality of provisioning information, the plurality of line loss information, the plurality of call event distribution information and the plurality of call trending information.

11. The computer-readable medium of claim 10, the method further comprising:

collecting maintenance information comprising toll free numbers, a plurality of work orders, and a plurality of Automatic Number Identifications (ANIs) associated with the telephony services provided to the user; and providing display information to the user which is representative of the maintenance information.

12. The computer-readable medium of claim 10, the method further comprising:

collecting migration information associated with the telephony services provided to the user comprising a plurality of Call Detail Report (CDR) data;

storing the migration information in one or more databases; and providing display information to the user which is representative of the migration information.

13. The computer-readable medium of claim 10, the method further comprising:

collecting profile information associated with the telephony services provided to the user comprising at least one service agreement;

storing the profile information in one or more databases; and providing display information to the user which is representative of the profile information.

14. The computer-readable medium of claim 10, the method further comprising:

collecting Preferred Primary Interexchange Carrier (PIC) information associated with the telephony services provided to the user comprising a Feature Group D footprint;

storing the PIC information in one or more databases; and providing display information to the user which is representative of the PIC information.

15. The computer-readable medium of claim 10, the method further comprising:

providing a display to the user for submitting and resolving rate disputes using the financial information;

receiving a rate dispute information;

storing the rate dispute information;

determining rate dispute resolution information based on the rate dispute information; and transmitting the rate dispute resolution information to the user.

16. The computer-readable medium of claim 10, the method further comprising:

collecting billing information associated with the telephony services provided to the user comprising contracted rate information; and providing the user with a display adapted to assist the user in accessing the contracted rate information.

17. The computer-readable medium of claim 10, wherein the financial information comprises an indication of a remaining deposit payment balance.

18. The computer-readable medium of claim 10, wherein the provisioning information comprises information about one or more unresolved rejects.

* * * * *